US007136197B2

(12) United States Patent
Tanimoto

(10) Patent No.: US 7,136,197 B2
(45) Date of Patent: Nov. 14, 2006

(54) INTERNET FACSIMILE MACHINE

(75) Inventor: Yoshifumi Tanimoto, Hirakata (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 939 days.

(21) Appl. No.: 10/202,557

(22) Filed: Jul. 23, 2002

(65) Prior Publication Data

US 2003/0020962 A1 Jan. 30, 2003

(30) Foreign Application Priority Data

Jul. 24, 2001 (JP) ............................ 2001-222774
Aug. 28, 2001 (JP) ............................ 2001-257793
Mar. 26, 2002 (JP) ............................ 2002-086124

(51) Int. Cl.
*B41J 1/00* (2006.01)
*G06F 15/00* (2006.01)
*H04N 1/00* (2006.01)

(52) U.S. Cl. .................................... 358/402; 358/1.15

(58) Field of Classification Search ............... 358/1.15, 358/402, 1.14, 1.16, 442, 407; 709/206
See application file for complete search history.

(56) References Cited

U.S. PATENT DOCUMENTS 6,437,873 B1 * 8/2002 Maeda ...................... 358/1.15
6,985,242 B1 * 1/2006 Toyoda ...................... 358/1.15
2002/0015188 A1 * 2/2002 Ishikawa et al. ............ 358/402
2002/0194282 A1 * 12/2002 Saito et al. ................. 709/206
2004/0105122 A1 * 6/2004 Schaeffer ................... 358/1.15
2005/0120087 A1 * 6/2005 Sekiguchi ................... 709/206

FOREIGN PATENT DOCUMENTS

JP 11-261628 9/1999

* cited by examiner

*Primary Examiner*—Kimberly Williams
*Assistant Examiner*—Scott Schlack
(74) *Attorney, Agent, or Firm*—Hogan & Hartson LLP

(57) ABSTRACT

The present invention relates to an Internet facsimile machine including a processor for receiving an electronic mail including format information of an original image data and a standardized image data. The processor returns an electronic mail having machine receiving ability information and receives an electronic mail including high quality image data formed in accordance with the machine receiving ability information. The processor processes the standardized image data before returning the email having the machine receiving ability information. The Internet facsimile machine also includes a controller for setting functions of the processor.

20 Claims, 23 Drawing Sheets

FIG. 7

```
21  Date: Wed,20 Sep 1995 00:19:00 +0900
    From: Recipient@terminalB.ifax
    Message-Id: <199509200020.12345@terminalB.ifax>
    Subject: Re:Internet FAX Full Mode Sample1
    To: Sender@terminalA.ifax
    MIME-Version: 1.0
    Content-Type: multipart/report;
            report-type=disposition-notification;
            boundary="RAA14128.773615766"

    --RAA14128.773615766

29  The message sent on 1995 Sep 20 at 00:18:00 +0900 to
    Recipient@terminalB.ifax with subject "Internet FAX
    Full Mode Sample 1" has been received. An alternative
    form of the message data is requested.

    --RAA14128.773615766
    Content-Type: message/disposition-notification

    Reporting-UA:Recipient.terminalB.ifax-Full Mode
    Original-Recipient: rfc822;Recipient@terminalB.ifax
    Final-Recipient: rfc822;Recipient@terminalB.ifax
    Original-message-ID: <19950920019.12345@terminalA.ifax>
27  Disposition: automatic-action/MDN-sent-automatically;
         deleted/alternative-preferred
28  Media-Accept-Features:
     (&(color=Binary)
       (image-file-structure=TIFF)
       (| (& (dpi=200)(dpi-xyratio=200/100) )
         (& (dpi=200)(dpi-xyratio=1))
         (& (dpi=400)(dpi-xyratio=1)))
       (| (image-coding=[MH,MR,MMR])
         (& (image-coding=JBIG)
           (image-coding-constraint=JBIG-T85)
           (JBIG-stripe-size=128)))
       (MRC-mode=0)
       (paper-size=[A4,B4])
       (ua-media=stationery))

    --RAA14128.773615766--
```

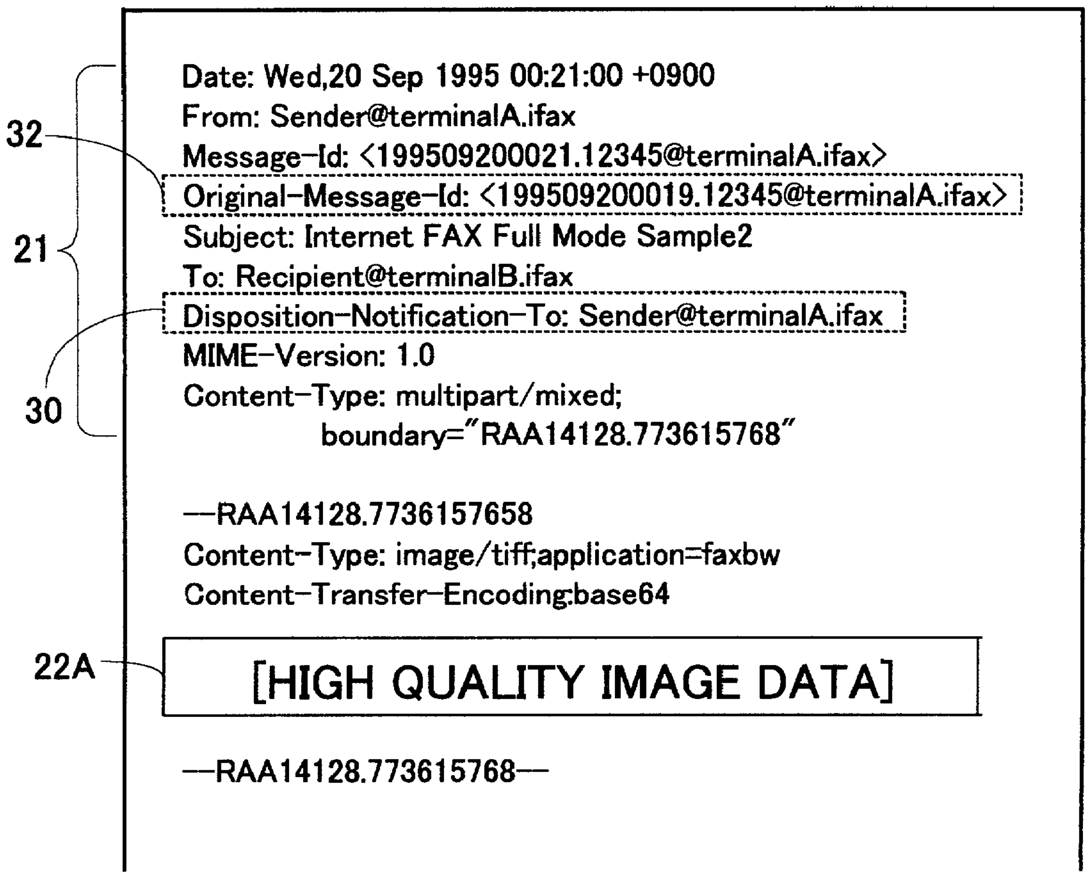

FIG. 8

```
Date: Wed,20 Sep 1995 00:21:00 +0900
From: Sender@terminalA.ifax
Message-Id: <199509200021.12345@terminalA.ifax>
Original-Message-Id: <199509200019.12345@terminalA.ifax>
Subject: Internet FAX Full Mode Sample2
To: Recipient@terminalB.ifax
Disposition-Notification-To: Sender@terminalA.ifax
MIME-Version: 1.0
Content-Type: multipart/mixed;
        boundary="RAA14128.773615768"

—RAA14128.7736157658
Content-Type: image/tiff;application=faxbw
Content-Transfer-Encoding:base64
```

[HIGH QUALITY IMAGE DATA]

—RAA14128.773615768—

FIG. 9

```
21
Date: Wed,20 Sep 1995 00:22:00 +0900
From: Recipient@terminalB.ifax
Message-Id: <199509200022.12345@terminalB.ifax>
Subject: Re:Internet FAX Full Mode Sample2
To: Sender@terminalA.ifax
MIME-Version: 1.0
Content-Type: multipart/report;
            report-type=disposition-notification;
            boundary="RAA14128.773615769"

--RAA14128.773615769

29A
The message sent on 1995 Sep 20 at 00:21:00 +0900 to
Recipient@terminalB.ifax with subject "Internet FAX
Full Mode Sample2" has been processed in Internet FAX
Full Mode.

--RAA14128.773615769
Content-Type: message/disposition-notification

Reporting-UA:Recipient.terminalB.ifax-Full Mode
Original-Recipient: rfc822;Recipient@terminalB.ifax
Final-Recipient: rfc822;recipient@terminalB.ifax
Original-message-ID: <19950920021.12345@terminalA.ifax>
31
Disposition: automatic-action/MDN-sent-automatically;processed
28
Media-Accept-Features:
  (&(color=Binary)
      (image-file-structure=TIFF)
      (| (& (dpi=200)(dpi-xyratio=200/100) )
         (& (dpi=200)(dpi-xyratio=1))
         (& (dpi=400)(dpi-xyratio=1)))
      (| (image-coding=[MH,MR,MMR])
         (& (image-coding=JBIG)
           (image-coding-constraint=JBIG-T85)
           (JBIG-stripe-size=128)))
      (MRC-mode=0)
      (paper-size=[A4,B4])
      (ua-media=stationery))

--RAA14128.773615769/terminalB.ifax--
```

| PROCESSING SETTING NAME | DEFAULT SETTING | EXCEPTIONAL SETTING | | | |
|---|---|---|---|---|---|
| | | TRANSMITTING SIDE ADDRESS | TRANSMITTING SIDE DOMAIN NAME | TERM DESIGNATION | SETTING PER COMMUNICATION |
| STANDARDIZED IMAGE DATA PRINT OUT SETTING IN S3 | TO PRINT OUT | SenderA@terminalB.ifax | jp<br>abc.com | 23:00–8:00<br>everyday | NEXT RECEIVING |
| HIGH QUALITY IMAGE DATA DEMAND SETTING IN S5 | NOT TO DEMAND | SenderC@abc.com<br>SenderD@ccc.co.jp | aaa.co.jp<br>bbb.co.jp | 01/MAY/2 23:00 – 01/MAY/6 8:00 | NO SETTING |

| PROCESSING SETTING NAME | DEFAULT SETTING | EXCEPTIONAL SETTING | | | |
|---|---|---|---|---|---|
| | | TRANSMITTING SIDE ADDRESS | TRANSMITTING SIDE DOMAIN NAME | TERM DESIGNATION | SETTING PER COMMUNICATION |
| STANDARDIZED IMAGE DATA PRINT OUT SETTING IN S3 | TO SKIP | Sender1@aaa.com | jp<br>def.com | 01/JUN/2 00:00 - 01/JUN/6 23:59 | NEXT RECEIVING |
| HIGH QUALITY IMAGE DATA DEMAND SETTING IN S5 | NOT TO SKIP | Sender@terminalH.ifax | ddd.co.jp<br>eee.co.jp | SUNDAY | NO SETTING |

| SETTING ITEM | STANDARD FORMAT | SPECIFIC NUMERIC DESIGNATION | PERCENTAGE DESIGNATION |
|---|---|---|---|
| 134 RECORDING PAPER SIZE | A4 | B4 SIZE OR LARGER | 120% OR GREATER |
| 135 RESOLUTION | 200dpi | 240dpi OR GREATER | 120% OR GREATER |

| DETERMINING STEP NAME | DEFAULT SETTING | INDIVIDUAL SETTING | | | | |
|---|---|---|---|---|---|---|
| | | | TRANSMITTING SIDE ADDRESS | TRANSMITTING SIDE DOMAIN NAME | TERM DESIGNATION | SETTING PER COMMUNICATION |
| DETERMINING STEP FOR PRESENCE OR ABSENCE OF RECORDING PAPER IN S4 | TO DETERMINE | TO DETERMINE | SenderA@terminalB.ifax | jp | 23:00-8:00 EVERYDAY | NEXT RECEIVING |
| | | NOT TO DETERMINE | SenderB@abc.com | abc.com | NO SETTING | NO SETTING |
| DETERMINING STEP FOR MEMORY REMAINING CAPACITY IN S5 | NOT TO DETERMINE | TO DETERMINE | NO SETTING | aaa.co.jp | 01/MAY/2 23:00-01/MAY/6 8:00 | NO SETTING |
| | | NOT TO DETERMINE | SenderD.ccc.co.jp | bbb.co.jp | NO SETTING | UNTIL NEXT 2 RECEIVING |
| DETERMINING STEP FOR DIFFERENCE IN IMAGE DATA IN S9 | TO DETERMINE | TO DETERMINE | SenderE@terminalD.ifax | xyz.com | SUNDAY, SATURDAY | UNTIL NEXT 3 RECEIVING |
| | | NOT TO DETERMINE | SenderF@ddd.co.jp | NO SETTING | NO SETTING | NO SETTING |
| DETERMINING STEP FOR COMMUNICATION TIME IN S10 | TO DETERMINE | TO DETERMINE | | ccc.co.jp | SUNDAY, SATURDAY | |

| DETERMINING STEP NAME | DEFAULT SETTING (144) | INDIVIDUAL SETTING (145) | | | | |
|---|---|---|---|---|---|---|
| | | | TRANSMITTING SIDE ADDRESS | TRANSMITTING SIDE DOMAIN NAME | TERM DESIGNATION | SETTING PER COMMUNICATION |
| DETERMINING STEP FOR WHETHER TO CARRY OUT RECEIVING CORRESPONDING TO RECEIVING ABILITY IN S6 | TO RECEIVE | TO RECEIVE | SenderE@terminalB.ifax | ddd.ac.jp | 01/MAY/10 12:00–01/MAY/10 13:00 | NEXT RECEIVING |
| | | NOT TO RECEIVE | SenderF@eee.com | def.com | NO SETTING | NO SETTING |
| DETERMINING STEP FOR WHETHER TO PRINT OUT UNDER DIFFERENT SIZE IN S7 | NOT TO RECEIVE | TO RECEIVE | NO SETTING | eee.co.jp | 23:00–8:00 EVERYDAY | NO SETTING |
| | | NOT TO RECEIVE | SenderG@ccc.co.jp | fff.co.jp | NO SETTING | NO SETTING |

INTERNET FACSIMILE MACHINE

FIELD OF THE INVENTION

The present invention relates to an Internet facsimile machine for transmitting and receiving image data by electronic mail.

DESCRIPTION OF THE RELATED ART

In this patent specification, an Internet facsimile machine for transmitting image data will be referred to as I-FAX of the transmitting side, and an Internet facsimile machine for receiving image data will be referred to as I-FAX of the receiving side.

In a conventional I-FAX for transmitting and receiving image data by electronic mail, image data transmitted and received, is standardized into a Modified Huffman (MH) format as an encoding method with 200 dpi (dots per inch) resolution, and A4 as the recording paper size. The standardized image data is attached to the electronic mail, and transmitting and receiving are carried out. The conventional I-FAX adopted a method in which the transmitting and receiving of the image data is completed within single transmitting and receiving of the electronic mails. Under this method, even when the I-FAX is provided with a transmitting and receiving ability for the high quality image data, for example, the resolution higher than 200 dpi or the recording paper size larger than A4, the high quality image data cannot be transmitted and received. Therefore, the I-FAX of receiving ability exchanging type is being proposed, that contains a function for exchanging the receiving ability information between the transmitting side and the receiving side, wherein the receiving ability information is concerned in the format of the image data such as the resolution or the recording paper size that the I-FAX of the receiving side is capable of receiving, and the I-FAX of receiving ability exchanging type transmits and receives the high quality image data.

Next, the operation in the transmitting and receiving of the image data by the conventional receiving ability exchanging typed I-FAX will be described in accordance with the sequence diagram shown in FIG. 22. Hereupon, the transmitting side and the receiving side are connected capable of carrying out the communication by the electronic mail.

First, the transmitting side scans an original image, and stores original image data (T261). The original image data is high quality comparing to the standardized image data, and has the image data format of, for example, 400 dpi as resolution, B4 as recording paper size, and MR (Modified Read) as the encoding method.

Next, the transmitting side forms a standardized image data from the original image data (T262), attaches the standardized image data to the electronic mail, and transmits the electronic mail to the receiving side (T263). The electronic mail is written with a message for urging the notification of information concerning the format of the original image data and the receiving ability.

Meanwhile, by following the message, the receiving side which received the electronic mail transmitted in T263, returns to the transmitting side, the electronic mail that is written with the message for demanding the transmission of the receiving ability information of the machine itself and the original image data (T264).

Next, the transmitting side that received the electronic mail returned in T264, interprets the receiving ability information, attaches the original image data to the electronic mail, and transmits the electronic mail to the receiving side (T266). Further, under this processing, there are cases in which the transmitting side forms a high quality image data of a third format in accordance with the receiving ability information (T265), attaches the third format image data to the electronic mail, in place of the original image data and, transmits the electronic mail. Hereupon, the third format image data differs from the original image data or the standardized image data. However, in this patent specification, the high quality image data of the third format that is formed and attached to the electronic mail under this processing, is to be included in the name, the original image data.

Meanwhile, the receiving side which received the electronic mail transmitted in T266, prints out the original image data that is attached to the electronic mail (T267).

When using the abovementioned receiving ability exchanging typed I-FAX, there is a merit in that the transmission and the receiving can be carried out for the high quality image data of which is in most suitable format to the receiving side. However, comparing to the general I-FAX, the number of the electronic mails to be exchanged for notifying the receiving ability information increases, and as a result, a communication time from the start until the end of the communication operation is long. Further, the abovementioned general I-FAX ends a communication procedure by just transmitting and receiving the electronic mail attached with the standardized image data only once.

Meanwhile, an intention of a user (receiver) who receives the image data is verifying, and there are cases in which it is desirable to receive and confirm the original under high image quality, and there are also cases in which it is desirable to confirm the original by receiving the original as soon as possible without questioning about the image quality of the original to be received. Nevertheless, when receiving the high quality image data by using the receiving ability exchanging typed I-FAX at all times, contrary to the intention of the user that it is desirable to confirm the original by receiving the original as soon as possible, when receiving the standardized image data by the general I-FAX, it is to be against the intention of the user that it is desirable to confirm the original by receiving under high image quality.

Therefore, an advantage of the present invention is to provide an I-FAX capable of receiving image data under the receiving method in accordance with the intention of the user.

Moreover, the image data format of the abovementioned original image data is diverse, and the I-FAX of the receiving side is required to be prepared at all times to respond to these various formats.

However, according to the usage state or the maintenance condition of the I-FAX of the receiving side, even when ability is originally provided for receiving and printing out the original image data, the original image data is not necessarily capable of being received and printed out at all times.

Thus, another advantage of the present invention is to provide an I-FAX capable of receiving the image data under the receiving method in accordance with the condition of the machine itself.

SUMMARY OF THE INVENTION

The present invention relates to an I-FAX that is capable of receiving an electronic mail including format information of an original image data and a standardized image data from an I-FAX of a transmitting side, capable of returning the electronic mail written with a receiving ability information of the machine itself, and capable of receiving the electronic mail including a high quality image data that is formed by the I-FAX of the transmitting side in accordance with the receiving ability information. Moreover, the I-FAX of the present invention includes a processor processing the standardized image data received in advance, and a setting means for setting a processing by the processor.

In addition, the processing by the processor means is to store in a storing device, the standardized image data received in advance, without printing it out.

In addition, the I-FAX includes a means for writing a message for demanding the high quality image data, in the electronic mail that is written with the receiving ability information of the machine itself.

In addition, the I-FAX includes a means for informing to user that the high quality image data is demanded.

In addition, the I-FAX stores in the storing device, the standardized image data received in advance, and sends back the electronic mail that is written with the receiving ability information of the machine itself. Then, the I-FAX receives the high quality image data formed by the transmitting side in accordance with the receiving ability information, prints out the high quality image data, and then deletes the standardized image data from the storing device.

In addition, the I-FAX includes a first determining means for determining whether or not the electronic mail including the high quality image data is received.

In addition, the I-FAX includes a second determining means for determining whether or not it is exceeding a communication time set in advance until receiving the electronic mail including the high quality image data when the first determining means determined that the high quality image data is not received.

In addition, when the second determining means is exceeding the communication time set in advance, the standardized image data is printed out.

In addition, the processing by the processing means is carried out in accordance with a processing setting that is set in advance.

According to the present invention, since by selecting and setting the processing of the standardized image data as to answer to the intention of the user concerning the receiving, according to the intention of the user, the communication time can be saved or the I-FAX can be made to receive the high quality image data, and it is convenient.

Moreover, according to the present invention, the standardized image data received in advance can be displayed or printed out when necessary, and it is convenient for the user when referring to the image data.

Moreover, according to the present invention, even in the case the high quality image data took long time to be received or cannot be received, the stored standardized image data can be referred, and since the image data can be confirmed reliably, it is convenient for the user.

Moreover, according to the present invention, useless communication becomes unnecessary to be carried out when the high quality image data is not required, and as a result, the communication time can be saved and it is useful.

Moreover, according to the present invention, since an address or a domain name of the transmitting side, the received time of the electronic mail, or the processing per communication can be set, the user can confirm the standardized image data in advance, or can receive the high quality image data, according to the transmitting side or the received time. As a result, the intention of the user concerning the receiving can be reflected precisely under simple setting, and it is convenient.

The present invention relates to an I-FAX including a function for receiving the electronic mail including the format information of the original image data and the standardized image data from the I-FAX of the transmitting side, returning the electronic mail that is written with the receiving ability information of the machine itself, and receiving as the electronic mail, including the high quality image data that is formed by the I-FAX of the transmitting side in accordance with the receiving ability information. In such I-FAX, a processor means is provided for processing not to demand the high quality image data when the standardized image data received in advance is printed out.

The present invention relates to an Internet facsimile machine including a function for receiving the electronic mail including the format information of the original image data and the standardized image data from the I-FAX of the transmitting side, returning the electronic mail that is written with the receiving ability information of the machine itself, and then receiving the original image data by the electronic mail from the I-FAX of the transmitting side. In such I-FAX, a detector is provided for detecting the condition of the machine itself, and a determining means is provided for determining whether or not to demand the original image data in accordance with the condition of the machine itself that is detected by the detector.

In addition, the I-FAX includes a setting means for setting the determining standard by the determining means.

In addition, the determining means determines not to demand the original image data when there is no recording paper appropriate for the machine itself.

In addition, the case in which there is no appropriate recording paper is the case in which the machine itself is not provided with the recording paper of the recording paper size indicated in the format information of the original image data.

In addition, the determination of the determining means is not to demand the original image data when there is no necessary storing capacity in the storing device.

The present invention relates to an I-FAX including a function for receiving the electronic mail including the format information of the original image data and the standardized image data from the I-FAX of the transmitting side, returning the electronic mail written with the receiving ability information of the machine itself, and then receiving the original image data as the electronic mail from the I-FAX of the transmitting side in accordance with the receiving ability information. Such I-FAX includes a determining means for determining whether or not to demand the original image data in accordance with the format information of the original image data, and a setting means for setting the determining standard of the determining means.

In addition, the determining standard is based on a difference between the format information of the standardized image data and the format information of the original image data.

In addition, the determining means determines whether or not to demand the original image data in accordance with the difference in the resolution of both image data.

In addition, the image data can be received under the receiving method corresponding to the condition of the machine itself.

According to the present invention, despite of the failure in the execution of the printing due to the lack of the recording paper, a load due to the demand for the original image data, is not applied to the network. Moreover, the communication can be carried out efficiently without wasting the communication time for useless communication.

Moreover, according to the present invention, the image data can be received under the appropriate receiving method corresponding to the image data.

Moreover, according to the present invention, by demanding the original image data, for example, when there is no substantial difference in both image data, the useless communication is not to be carried out. As a result, the image data can be received efficiently.

According to another aspect of the present invention, there is provided an I-FAX including a function for receiving the electronic mail having the format information of the original image data and the standardized image data from the I-FAX of the transmitting side, returning the electronic mail written with the receiving ability information of the machine itself, and then receiving the high quality image data, which is formed by the I-FAX of the transmitting side in accordance with the receiving ability information, as an electronic mail, from the I-FAX of the transmitting side. In addition, the I-FAX includes a function for distributing the received image data. According to such an I-FAX, in the case of receiving the standardized image data and then sending back the electronic mail, which is written with the receiving ability information of the machine itself, the I-FAX does not distribute the standardized image data, but when receiving the high quality image data afterwards, the I-FAX distributes only the high quality image data.

In addition, according to another aspect of the present invention, in the case of receiving the standardized image data and then sending back the electronic mail, which is written with the receiving ability information of the machine itself, the I-FAX stores the standardized image data, and then, in the case it is determined that the high quality image data cannot be received afterwards, the I-FAX distributes the stored standardized image data.

According to the present invention, both of the standardized image data and the high quality image data, which have common contents, are not distributed to the same destination. As a result, the efficiency in the communication is improved, and it is prevented from the recording paper being wasted at the destination.

According to the present invention, even in the case the high quality image data cannot be received due to a communication error or the like, the standardized image data that is received in advance, can be used as a backup image data for distribution.

BRIEF DESCRIPTION OF THE DRAWINGS

FIG. 7 is a view showing an example of the electronic mail including a message for demanding the original image data and the receiving ability information of the machine itself, which is to be used under the receiving ability exchanging mode.

FIG. 8 is a view showing an example of the electronic mail including the original image data, which is to be used under the receiving ability exchanging mode.

FIG. 9 is a view showing an example of the delivery confirmation mail, which is to be used under the receiving ability exchanging mode.

FIG. 12 is a view showing an example of the table TA which shows the processing setting that is set in advance.

FIG. 13 is a view showing an example of the setting table TB for selecting the determining step according to the first embodiment of the present invention.

FIG. 19 is a view showing an example of the table TA1 for setting the determining standard of the processing according to the third embodiment of the present invention.

FIG. 20 is a view showing an example of the table TB1 for setting each processing operation according to the classification of the electronic mail according to the third embodiment of the present invention.

FIG. 21 is a view showing an example of the table TC1 for setting each processing operation according to the classification of the electronic mail according to the third embodiment of the present invention.

DETAILED DESCRIPTION OF THE PREFERRED EMBODIMENTS

The embodiments of the present invention will be described in reference to the accompanying drawings. Further, an I-FAX of a side to receive an image data by an electronic mail will be referred to as the I-FAX of the receiving side, and the I-FAX of the side to transmit the image data is to be referred to as the I-FAX of the transmitting side.

Figure 1:
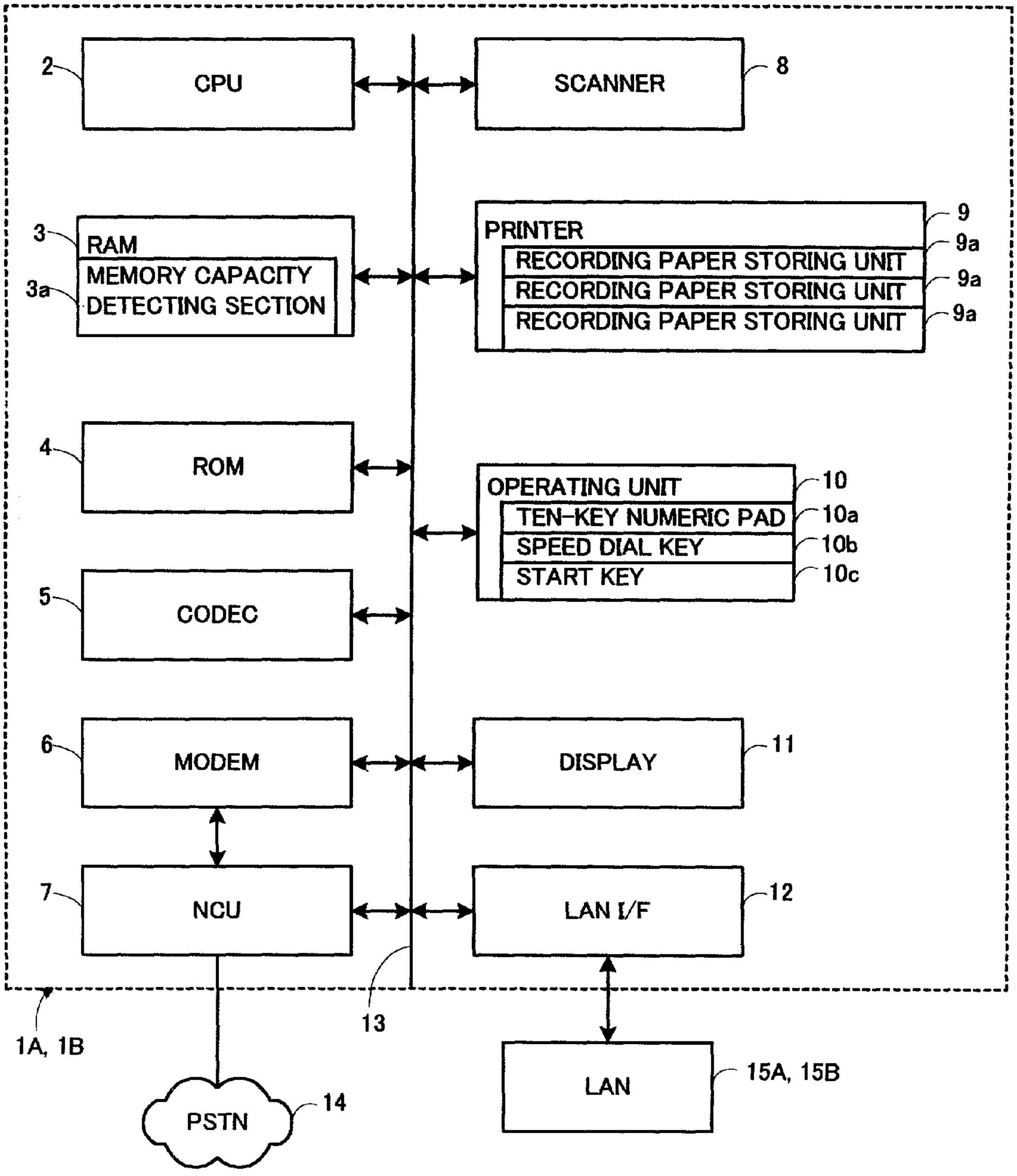
FIG. 1 is a block diagram showing a specific structure of an I-FAX (of transmitting side and receiving side) according to an embodiment of the present invention.

The I-FAX of the receiving side and the I-FAX of the transmitting side have the same hardware structure. In other words, as shown in the block diagram of FIG. 1, each of the I-FAX of the receiving side 1B and the I-FAX of the transmitting side 1A includes CPU (Central Processing Unit) 2, RAM (Random Access Memory) 3, ROM (Read Only Memory) 4, a codec 5, a modem 6, NCU (Network Control Unit) 7, a scanner 8, a printer 9, an operating unit 10, a display 11, LAN I/F (Local Area Network Interface) 12 or the like. Each of the devices is connected via a bus 13 so that a communication can be carried out.

The CPU 2 controls each of the devices composing the I-FAX 1A and the I-FAX 1B, in accordance with a control program that is stored in the ROM 4.

The RAM 3 functions as a storing device to store a temporary data to be needed when the control program is carried out, and to store a standardized image data, or an original image data higher in its quality than the standardized image data, facsimile number data, electronic mail addresses, or the like.

The ROM 4 stores the control program for controlling the I-FAX 1A and the I-FAX 1B, such as a transmitting and receiving procedure of a facsimile, or a transmitting and receiving procedure of the electronic mail.

The codec 5 carries out an encoding processing for encoding the image data scanned by the scanner 8 under an encoding method such as MH (Modified Huffman), MR (Modified Read), MMR (Modified Modified Read) or the like. Moreover, the codec 5 carries out a decoding processing for decoding the received image data.

The modem 6 carries out a modulation and demodulation of a communication data by following ITU-T (International Telecommunication Union-Telecommunications) Recommendation V.34 standard or other similar standard.

The NCU 7 is a network control device for connecting and disconnecting the line with PSTN (Public Switched Telephone Network) 14.

The scanner 8 scans a shading of the original by an image sensor such as CCD (Charged Coupled Device), and outputs the converted binary image data.

The printer 9 is formed of an electrophotographic method, an inkjet method or the like, and prints out the image data onto a recording paper. For example, by an indication from the CPU 2, the printer 9 prints out the image data of the original scanned by the scanner 8, the image data received by the facsimile, or the image data that is attached to the received electronic mail.

The operating unit 10 includes, for example, a ten-key numeric pad 10*a* for inputting facsimile numbers or the like, speed dial keys 10*b* for calling from speed dial numbers, and a start key 10*c* for carrying out, such as the starting of the scanning operation of the original. Various operations are carried out from the operating unit 10.

The display 11 is a displaying device of LCD (Liquid Crystal Display), CRT (Cathode Ray Tube) display or the like, and displays for example, the image data received by the facsimile, the image data received by the electronic mail, or a guide message for operation.

The LAN I/F 12 is an interface for connection with LAN (Local Area Network) 15A, 15B, and connects the I-FAX 1A, 1B and the LAN 15A, 15B, so that the communication can be carried out. The I-FAX 1A, 1B carries out the transmitting and receiving of the electronic mail through this interface.

The I-FAX 1A, 1B are provided with a function for transmitting and receiving the image data of the original by G3 facsimile communication method. Moreover, the I-FAX 1A, 1B are provided with TCP/IP (Transmission Control Protocol/Internet Protocol) which is Internet Standard Protocol, so that I-FAX 1A, 1B are capable of transmitting and receiving the electronic mail that is attached with the image data. The electronic mail is, for example, the electronic mail of MIME (Multipurpose Internet Mail Extensions) format, and is attached with the image data that is encoded by base64.

Figure 2:
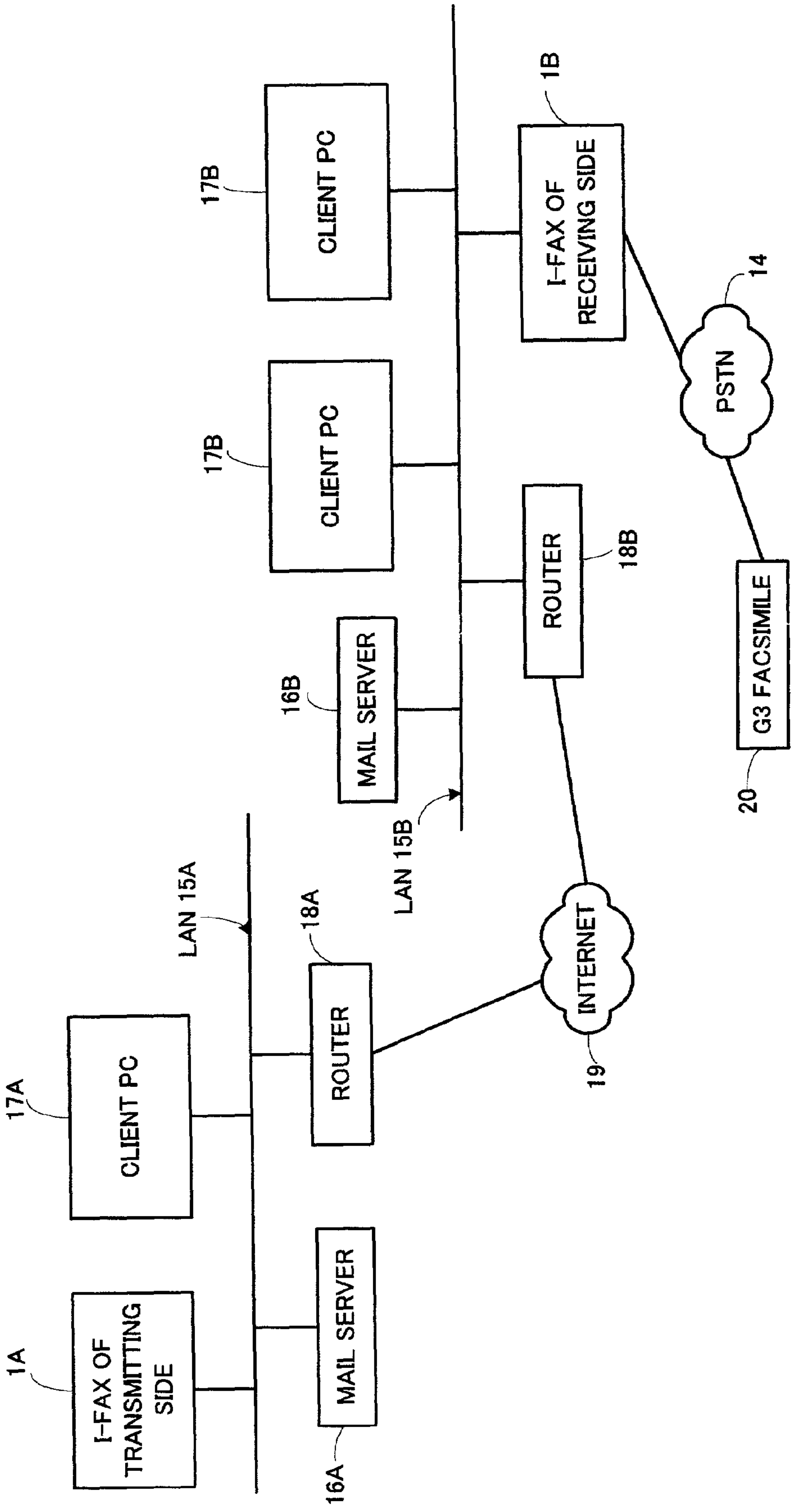
FIG. 2 is a block diagram showing an example of a network environment where the I-FAX (of transmitting side and receiving side) are provided according to an embodiment of the present invention.

The operation of the I-FAX 1A, 1B will be described for the operation in a network environment (A) that is shown in FIG. 2 as an example. The I-FAX of the receiving side 1B is connected to a mail server 16B, a client PC (Personal Computer) 17B, and a router 18B reciprocally through LAN 15B so that communication can be carried out. The I-FAX of the transmitting side 1A is connected to a mail server 16A, a client PC 17A, and a router 18A reciprocally through LAN 15A so that the communication can be carried out. Moreover, the LAN 15A is connected to the Internet 19 via the router 18A, and the LAN 15B is connected to the Internet 19 via the router 18B, so that the communication can be carried out. Accordingly, the I-FAX of the receiving side 1B can receive the electronic mail that is transmitted by the I-FAX of the transmitting side 1A through the mail servers 16A, 16B, the Internet 19 or the like, and by attaching the image data to the electronic mail, the image data can be transmitted and received. Moreover, the I-FAX of the receiving side 1B can transmit by the facsimile, the image data to G3 facsimile 20 through the PSTN 14. In addition, the image data received by the facsimile can be printed out at the I-FAX of the receiving side 1B, or distributed to the client PC 17B through the LAN 15B.

"Simple mode", "delivery confirmation mode", and "receiving ability exchanging mode" of the electronic mail communication procedures of the Internet facsimile between the I-FAX 1A and the I-FAX 1B in the network environment (A) will be described in accordance with the sequence diagrams shown in FIG. 3A through FIG. 3C, and examples of the electronic mail shown in FIG. 4 through FIG. 9.

Figure 3A:
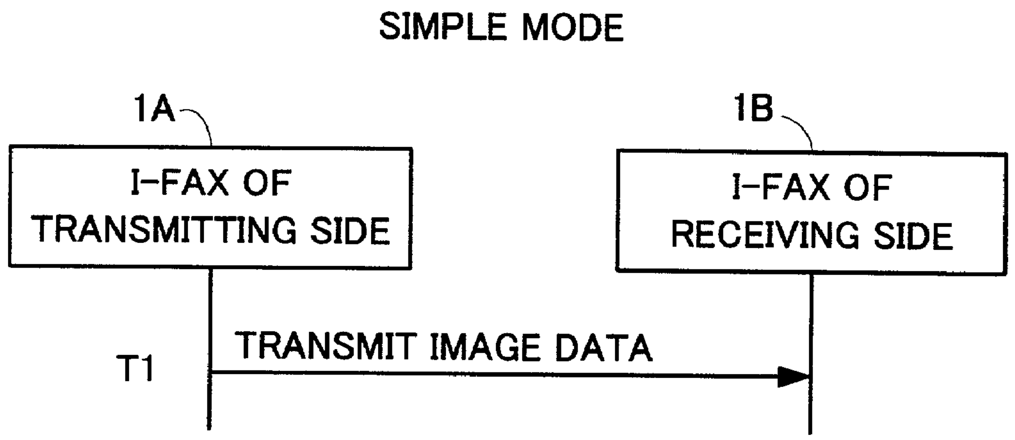
FIGS. 3A~3C are sequence diagrams showing communication procedure of electronic mail between the I-FAX of the transmitting side and the I-FAX of the receiving side.

First, according to the simple mode shown in FIG. 3A, the I-FAX of the transmitting side transmits the electronic mail, the I-FAX of the receiving side receives the electronic mail, and the transmitting and receiving operation is ended. The electronic mail is an electronic mail of MIME format, and includes of an electronic mail header information 21 that includes the address of the destination device, and an attached image data 22. The image data is the standardized image data, and is printed out by the I-FAX of the receiving side 1B.

Figure 3B:
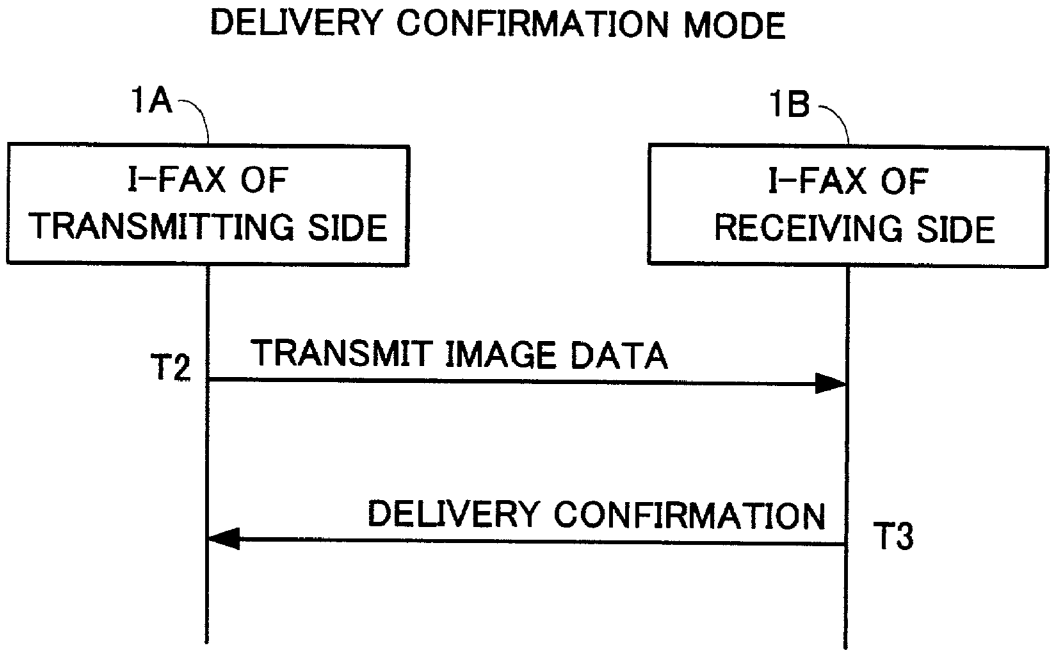
Figure 5:
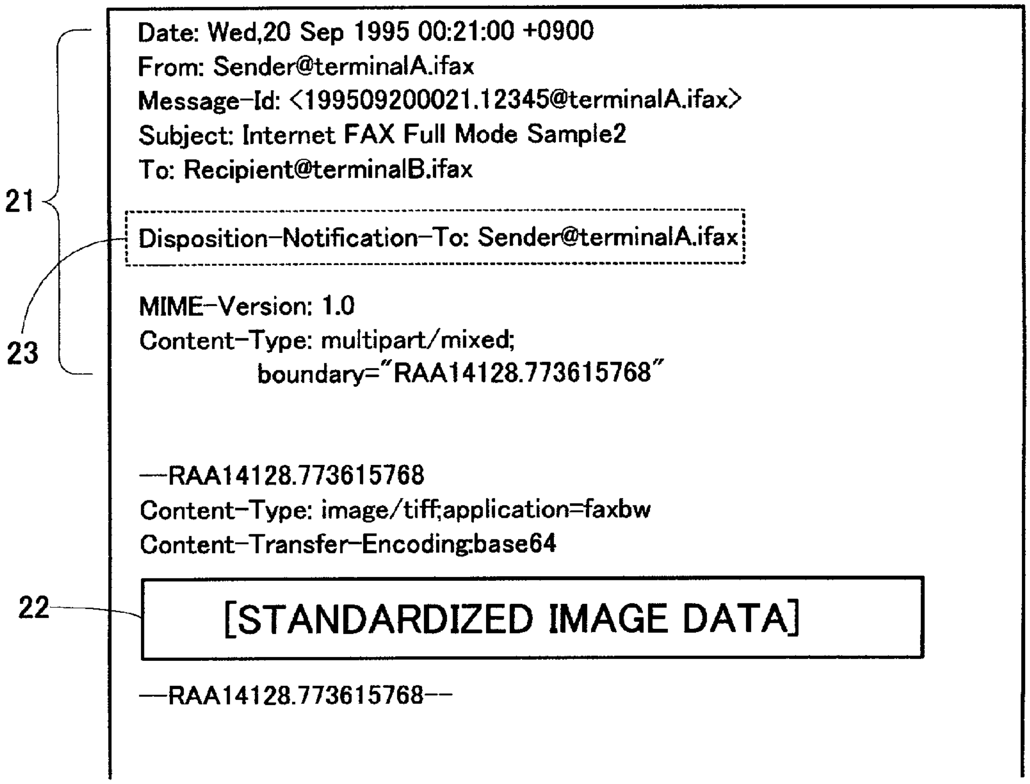
FIG. 5 is a view showing an example of the electronic mail to be used under delivery confirmation mode.

Next, in the delivery confirmation mode shown in FIG. 3B, the I-FAX of the transmitting side 1A forms the electronic mail attached with the standardized image data 22, and transmits the electronic mail to the I-FAX of the receiving side 1B (T2). In the electronic mail, a message 23 is written for demanding a return of the electronic mail of which is to be returned as a reply for the confirmation of the delivery, as shown in FIG. 5 as an example. In the example shown in FIG. 5, the delivery confirmation demanding message 23 is comprised of a section showing the demand for the delivery confirmation mail by the wording of "Disposition-Notification-To:", and the address of the I-FAX of the transmitting side 1A to be returned with the delivery confirmation mail by the wording of "Sender@terminalA.ifax".

Next, in accordance with the delivery confirmation demanding message 23, the I-FAX of the receiving side 1B forms the delivery confirmation mail, and returns the mail to the I-FAX of the transmitting side 1A (T3).

Figure 3C:
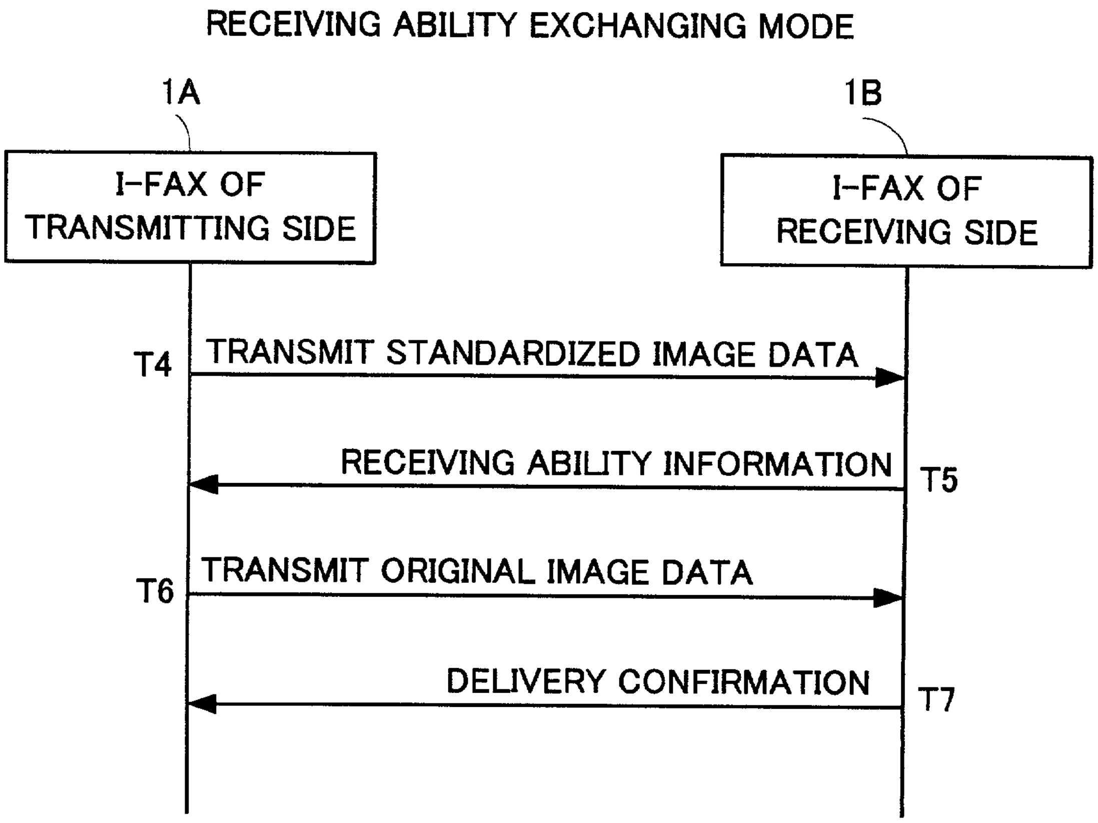
Figure 4:
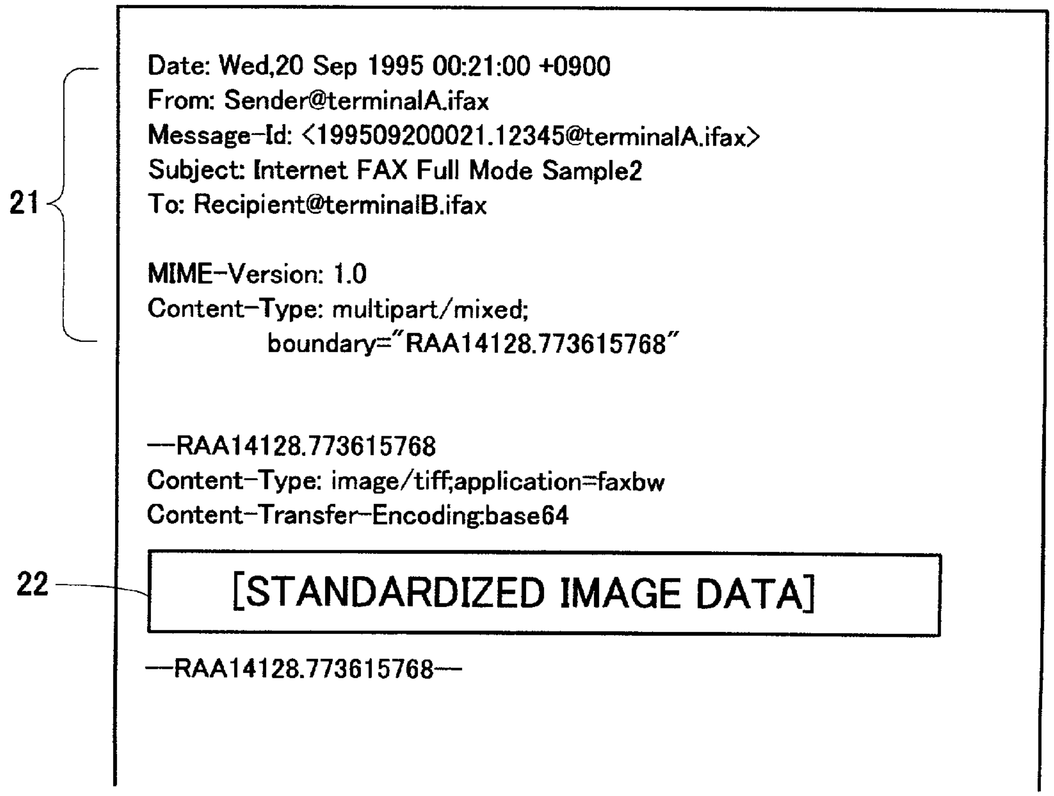
FIG. 4 is a view showing an example of the electronic mail to be used under simple mode.
Figure 6:
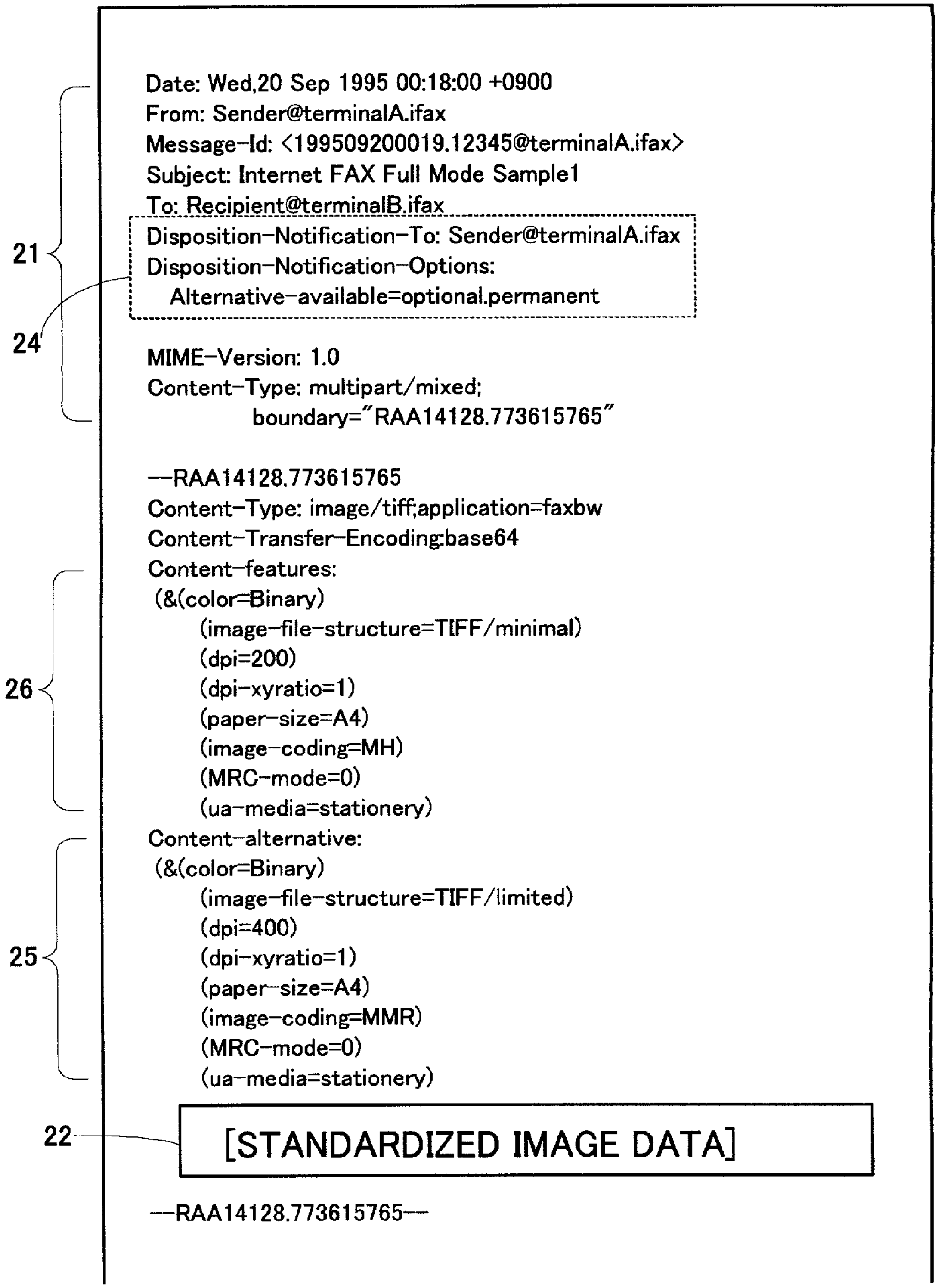
FIG. 6 is a view showing an example of the electronic mail including a message indicating the transmission of an original image data when there is a prescribed demand, which is to be used under receiving ability exchanging mode.

Consequently, according to the receiving ability exchanging mode shown in FIG. 3C, the I-FAX of the transmitting side 1A forms the standardized image data from the original image data, attaches the standardized image data 22 to the electronic mail, and transmits the electronic mail to the I-FAX of the receiving side 1B (T4). The electronic mail includes for example, a message 24 indicating the transmission of the high quality image data when there is a prescribed demand and a notification of the receiving ability information from the machine of the other end, a format information 25 of the original image data, and a format information 26 of the standard image data, as shown in FIG. 6 as an example.

Meanwhile, the I-FAX of the receiving side 1B that received such electronic mail, forms the electronic mail as shown in FIG. 7. The electronic mail as shown in FIG. 7 includes for example, a message 27 for demanding the transmission of the high quality image data, a receiving ability information 28 of the machine itself, and an explanatory message 29 for explaining the role of the electronic mail. Then, the I-FAX of the receiving side 1B returns the electronic mail to the I-FAX of the transmitting side 1A (T5).

Meanwhile, the I-FAX of the transmitting side 1A that received the electronic mail in T5, forms the most appropriate high quality image data of which can be received by the I-FAX of the receiving side 1B, in accordance with the receiving ability information 28 that is written in the electronic mail. Then, by following the message 27 which demands the high quality image data, the I-FAX of the transmitting side 1A attaches the high quality image data 22A to the electronic mail including the delivery confirmation demanding message 30 as shown in FIG. 8, and transmits the electronic mail to the I-FAX of the receiving side 1B (T6).

Lastly, the I-FAX of the receiving side 1B receives the electronic mail transmitted in T6. By following the delivery confirmation demanding message 30, the I-FAX of the receiving side 1B forms the delivery confirmation mail, and transmits the mail to the I-FAX of the transmitting side 1A (T7). The delivery confirmation mail includes, for example, an explanatory message 29A for explaining the role of the electronic mail, and a message 31 showing that the electronic has been delivered, as shown in FIG. 9. Further, in the receiving ability exchanging mode, there are cases in which the high quality image data is not demanded, for example, when the high quality image data is not required in the I-FAX of the receiving side 1B. In such case, the procedures of T5, T6, T7 are not carried out.

Figure 10:
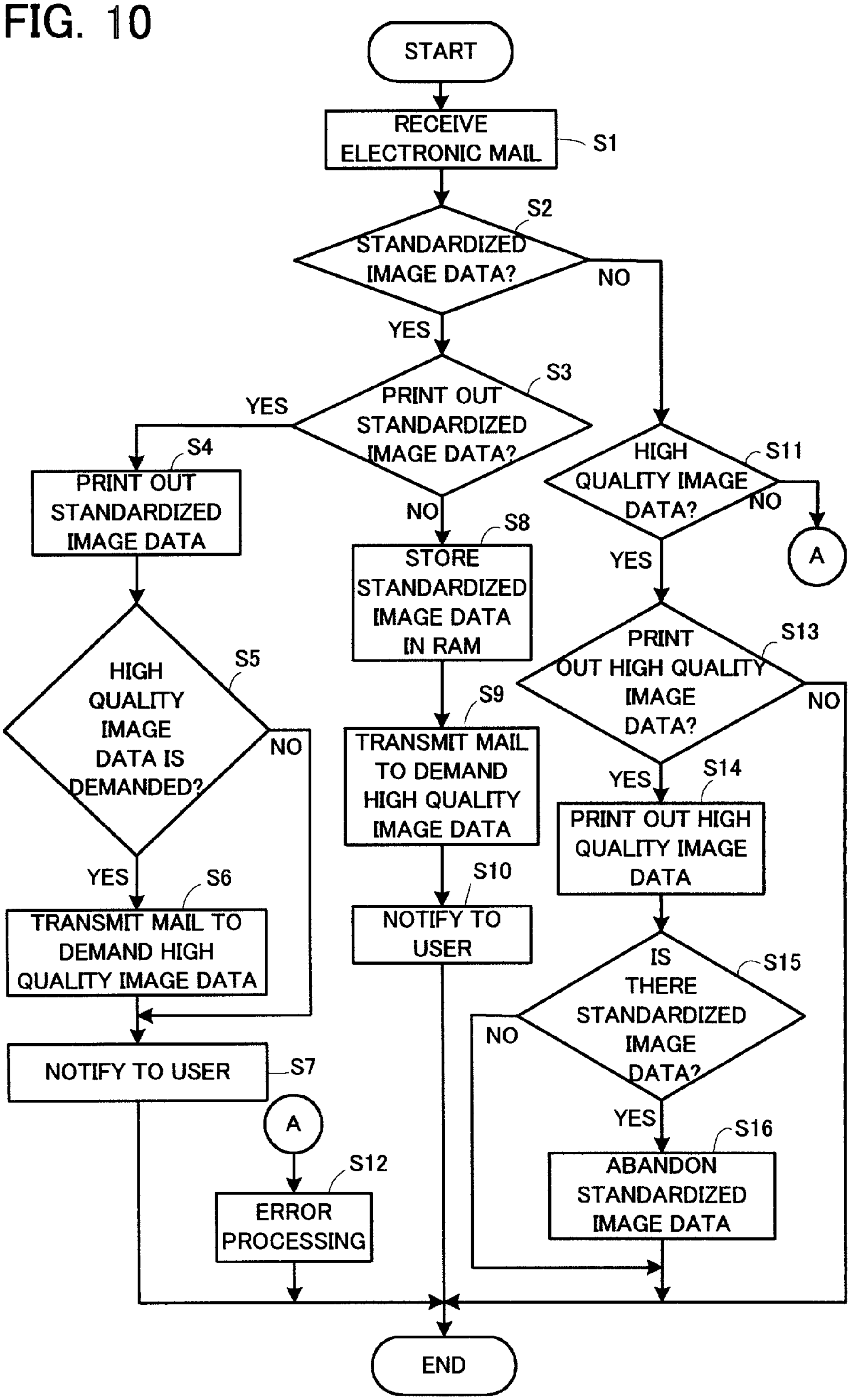
FIG. 10 is a flow chart showing the operation when receiving the electronic mail of the receiving ability exchanging mode of the I-FAX of the receiving side according to a first embodiment of the present invention.

Next, the processing operation when receiving the electronic mail at the I-FAX of the receiving side 1B in the receiving ability exchanging mode according to the first embodiment of the present invention, will be described in reference to the flow chart shown in FIG. 10. The operation to be described in accordance with the flow chart, is carried out in the I-FAX of the receiving side 1B, by following the control command generates by the CPU 2 in accordance with the control program that is stored in the ROM 4. The control command includes a control command that is generated by the CPU 2 fetching the indication, which is based on the operation at the operating unit by the user, and a control command that is generated by the CPU 2 fetching the processing indication set in the RAM 3 or the ROM 4 in advance. The control command is to carry out the set processing.

First, the I-FAX of the receiving side 1B which received the electronic mail in S1, analyzes the content of the electronic mail, and determines whether or not the electronic mail is the electronic mail to be used in the Internet facsimile, and also whether or not it is the electronic mail attached with the standardized image data in T4 of the receiving ability exchanging mode (S2). That is, the I-FAX determines whether or not the format information 25 of the original image data is included in the electronic mail, when the received electronic mail is the electronic mail as shown in FIG. 6, or the I-FAX determines whether or not the message 24 indicating the transmission of the original image data is written in the electronic mail, when notifying the receiving ability information of the machine itself. When the received electronic mail is determined to be the electronic mail in T4 of the receiving ability exchanging mode in S2, it is determined whether or not to print out the standardized image data, in accordance with the processing indication from the user or the processing setting set in advance (S3). When it is determined to print out the standardized image data in S3, the printer 9 prints out the standardized image data (S4).

After the standardized image data is printed out in S4, the I-FAX 1B determines whether or not to demand the high quality image data in accordance with the processing indication of the user or the processing setting that is set in advance (S5). In the case it is determined to demand the high quality image data, the I-FAX of the receiving side 1B forms the electronic mail written with the receiving ability information 28 of the machine itself and the message 27 for demanding the high quality image data as shown in FIG. 7, transmits the electronic mail to the I-FAX of the transmitting side 1A, and demands the high quality image data (S6). Next, the fact that the high quality image data is demanded, is notified to the user by displaying the fact on the display 11, the client PC 17B or the like (S7). Then, the processing operation of the electronic mail of when receiving the electronic mail in T4 of the receiving ability exchanging mode is ended, and it proceeds to a standby operation for expecting to receive the electronic mail that is attached with the high quality image data in T6 of the receiving ability exchanging mode. Moreover, the standby operation does not prohibit the transmission and the receiving of other image data.

Meanwhile, in the case it is determined not to demand the high quality image data in S5, the fact that the high quality image data is not to be demanded, is notified to the user by displaying the fact on the display 11, the client PC 17B or the like (S7). In such case, it corresponds to the case in which the high quality image data is not to be demanded in the receiving ability exchanging mode, and it is to be the end of a series of the transmitting and receiving operation of the receiving ability exchanging mode.

Meanwhile, in the case it is determined not to print out the standardized image data in S3, the standardized image data is stored in the RAM 3 (S8), and the electronic mail for demanding the high quality image data is transmitted to the I-FAX of the transmitting side 1A (S9). Then, the fact that the high quality image data is demanded is notified to the user by displaying the fact on the display 11 or the client PC 17B (S10), and the processing operation of the electronic mail of when receiving the electronic mail in T4 of the receiving ability exchanging mode is ended.

Meanwhile, in the case it is determined in S2 that the received electronic mail is not the electronic mail in T4 of the receiving ability exchanging mode, it is determined further whether or not the received electronic mail is the electronic mail attached with the high quality image data in T6 of the receiving ability exchanging mode (S11). When it is determined "NO", an error processing is carried out as the other electronic mail (S12). The term other electronic mail here is, for example, the electronic mail not including the image data as the attached file. Moreover, the error processing is, for example, to abandon the other electronic mail, or to display the fact on the display 11 to notify to the user that the other electronic mail is received.

Meanwhile, in the case it is determined in S11 that the received electronic mail is the electronic mail in T6 of the receiving ability exchanging mode, in accordance with the processing indication of the user, or in accordance with whether or not the indicating information of the fact that the high quality image data is not to be printed out by the operation to be described hereinafter is stored in the RAM3, it is determined whether or not to print out the high quality image data that is attached to the electronic mail (S13). In the case it is determined not to print out the high quality image data, when necessary, the delivery confirmation mail is transmitted, and the series of the transmitting and receiving operation of the receiving ability exchanging mode is ended.

When it is determined to print out the high quality image data in S13, the printer 9 prints out the high quality image data (S14). Then, it is determined whether or not the standardized image data is stored in the RAM 3 (S15), and in the case it is determined that the standardized image data is not stored in the RAM 3, when necessary, the delivery confirmation mail is transmitted, and it is to be the end of the series of the transmitting and receiving operation of the receiving ability exchanging mode.

Meanwhile, in the case the standardized image data is stored in S15, the standardized image data is deleted and abandoned from the RAM 3 (S16), and when necessary, the delivery confirmation mail is transmitted, and it is to be the end of the series of the transmitting and receiving operation of the receiving ability exchanging mode.

In each of the abovementioned determining steps of S3, S5, to determine in accordance with the processing setting that is set in advance, is to refer to a setting table TA at the processing of each determining step, and then to carry out the determination based on the setting table TA. Such setting table TA is formed in advance, wherein as shown in FIG. 12 for an example, the setting for indicating the processing is set per each processing, as the indication of the user or as a default setting of the I-FAX of the receiving side 1B, and the setting table TA is stored in the RAM 3.

According to the setting table TA shown in FIG. 12, for example, since the setting for the determination whether or not to print out the standardized image data in S3 is set "to print out" in the default setting 32 of the I-FAX of the receiving side 1B, in the case the received electronic mail does not correspond to an exceptional setting 33 to be described hereinafter, it is to be determined "to print out" the standardized image data. Moreover, for the exceptional setting 33, the following each items can be set: transmitting side address 34, transmitting side domain name 35, term designation 36, and setting per communication 37. In the case the received electronic mail corresponds to any one of the exceptional setting 33, it is to be determined to carry out the operation contrary to the default setting 32, so that, "not to print out" in S3.

By describing in a further detail, since "SenderA@terminalB.ifax" is set as the transmitting side address 34 in the exceptional setting 33, and "jp" and "abc.com" are set as the transmitting side domain name 35 in the exceptional setting 33, in the case the transmitting side address 34 of the received electronic mail is "SenderA@terminalB.ifax", or in the case the transmitting side domain name 35 includes "jp" or "abc.com", it is to be determined "not to print out" in the determination in S3. In addition, since "23:00–8:00 everyday" is set as the term designation 36 in the exceptional setting 33, in the case the electronic mail is received within a period of time between 23:00 and 8:00, it is to be determined in S3 "not to print out". Furthermore, since "next receiving" is set as the setting per communication 37 in the exceptional setting 33, in the case the determination in S3 becomes necessary by receiving the electronic mail, it is to be determined in S3 "not to print out". As in the same manner, for the determination in S5, the determination is to be carried out by referring to the setting table TA and in accordance with the setting table TA.

Moreover, by preparing the setting table TB for setting to skip the processing at each determining step as shown in FIG. 13, and by referring to the setting table TB, the processing at each determining step can be made to be selected. In FIG. 13, the setting of the determination for printing out the standardized image data in S3, is set "to skip" in the default setting 32A, and in the case the received electronic mail does not correspond to the exceptional setting 33A, the determination in S3 is to be skipped (to determine "YES" unconditionally in S3, and to proceed to the processing in S4). Meanwhile, in the case the received electronic mail corresponds to any one of the exceptional setting 33A, so that, in the case "SenderI@aaa.com" is included for the transmitting side address 34A, or in the case "jp" or "def.com" are included as the transmitting side domain name 35A, or in the case the electronic mail is received between Jun. 2, 2001 and Jun. 6, 2001 since the term designation 36A is set as "01/Jun/2 00:00–01/Jun/6 23:59", or in the case of receiving the next electronic mail since "next receiving" is set in the setting per communication 37A, the determination in S3 is to be carried out. In such case, as in the manner, the determination is S3 is to be carried out in accordance with the processing indication of the user or the reference result of the setting table TA.

As in the same manner, the default setting 32A in the determination step in S5 is set at "not to skip", and when the received electronic mail does not correspond to the exceptional setting 33A, the determining step in S5 is to be carried out. That is, the determination in S5 is to be carried out in accordance with the processing indication of the user or the reference result of the setting table TA.

According to the flow chart shown in FIG. 11, it will be described that, the operation of the I-FAX of the receiving side 1B during the period of time for waiting to receive the electronic mail attached with the high quality image data transmitted from the I-FAX of the transmitting side 1A (the electronic mail corresponding to T6 of the receiving ability exchanging mode), in the case that the I-FAX of the receiving side transmits the electronic mail for demanding the high quality image data in the abovementioned processing step S9 (the electronic mail corresponding to T5 of the receiving ability exchanging mode).

First, the I-FAX of the receiving side 1B determines whether or not there is the demand to print out the standardized image data in accordance with, for example, the indication from the user or the processing setting of which is set in advance, during the period of time when the high quality image data is demanded (S21). When it is determined that there is the print out demand, the standardized image data stored in the RAM 3 in S8 is printed out by the printer 9 (S23).

When it is determined that there is no print out demand in S21, it is determined whether or not there is the demand for displaying the standardized image data in accordance with, for example, the indication from the user or the processing setting that is set in advance (S22). When it is determined that there is the displaying demand, the standardized image data stored in the RAM 3 in S8 is displayed on the display 11 or the client PC 17B (S24).

Next, when the standardized image data is printed out in S23, or when the standardized image data is displayed in S24, in the case of receiving the electronic mail attached with the high quality image data in T6 of the receiving ability exchanging mode after these output operations in S23 or in S24, it is determined whether or not to print out the high quality image data in accordance with the indication of the user or the processing setting that is set in advance (S25). When it is determined not to print out the high quality image data, the fact is stored as the indication information in the RAM 3 (S26). Then, in the determining step S13 for determining whether or not to print out the high quality image data of when receiving the electronic mail that is attached with the high quality image data in T6 of the abovementioned receiving ability exchanging mode, it is determined not to print out the high quality image data in accordance with the indication information that is stored in the RAM 3 in S26, and the high quality image data is not to be printed out.

Meanwhile, when it is determined that there is no demand for displaying the image data in S22, it is determined whether or not to print out the high quality image data when receiving the electronic mail that is attached with the high quality image data in T6 of the receiving ability exchanging mode, in accordance with the indication from the user or the processing setting set in advance (S27). When it is determined not to print out the high quality image data, the fact is stored as the indication information in the RAM 3 (S28). Then, as in the same manner as in S26, in the determining step S13 for determining whether or not to print out the high quality image data of when receiving the electronic mail that is attached with the high quality image data in T6 of the abovementioned receiving ability exchanging mode, the high quality image data is to be not printed out in accordance with the indication information that is stored in the RAM 3 in S28. Further, since it is set that the high quality image data is not to be printed out, it is determined whether to print out the stored standardized image data (S33), or to display the stored standardized image data (S34), in accordance with the indication from the user or the processing setting that is set in advance. Then, the standardized image data is printed out by the printer 9 (S35), or the standardized image data is displayed on the display 11 or the client PC 17B (S36), and as a result, the user can confirm the image data.

Meanwhile, when it is determined to print out the high quality image data in S27, next, in accordance with the indication from the user or the processing setting that is set in advance, it is determined whether or not there is the demand for interrupting the series of the transmitting and receiving processing in the receiving ability exchanging mode (S29). When it is determined "NO", it is determined whether or not there is a communication error in the communication by the electronic mail (S30).

When it is determined that there is no communication error in S30, it is determined whether or not the electronic mail that is attached with the high quality image data in T6 of the receiving ability exchanging mode is received (S31). In the case the electronic mail attached with the high quality image data in T6 of the receiving ability exchanging mode is received, the processing shown in the flow chart of FIG. 11 is ended, and it proceeds to the processing of when the electronic mail is received. In other words, it proceeds to the receiving processing of when receiving the electronic mail, that is shown in the flow chart of FIG. 10, more specifically to the processing of S13~S16.

Meanwhile, when the high quality image data is not received in S31, it is determined whether or not it is exceeding (time out) the communication time until receiving the electronic mail attached with the high quality image data in T6 of the receiving ability exchanging mode that is set in advance (S32). When it is determined that is it not the time out, it returns to S29 to repeat the processing.

Meanwhile, in the case it is determined that there is the interrupting demand in S29, or in the case it is determined that there is the communication error in S30, or in the case it is determined that it is the time out in S32, in accordance with the indication of the user or the processing setting that is set in advance, it is determined whether or not to print out standardized image data (S33). When it is determined to print out, the standardized image data is printed out from the printer 9 (S35), the user confirms the image data, and the processing for the time being is to be ended.

Moreover, it is determined whether or not there is the demand for displaying the image data in accordance with the indication from the user or the processing setting that is set in advance (S34). When it is determined that there is the displaying demand, the standardized image data is displayed on the display 11 or the client PC 17B (S36), the image data is confirmed by the user, and the processing for the time being is to be ended.

Further, in the determination in S21, S22, S25, S27, S29, S33, S34 or the like, to determine in accordance with the processing setting that is set in advance, is to determine in accordance with the default setting, the transmitting side address or domain name, the term designation, the setting per communication or the like, by referring to the setting table that is set in advance in the same manner as the abovementioned setting table TA and that is stored in the RAM 3. Moreover, the execution of each determining step can be made selectable by setting the setting table similar to the setting table TB.

Figure 11:
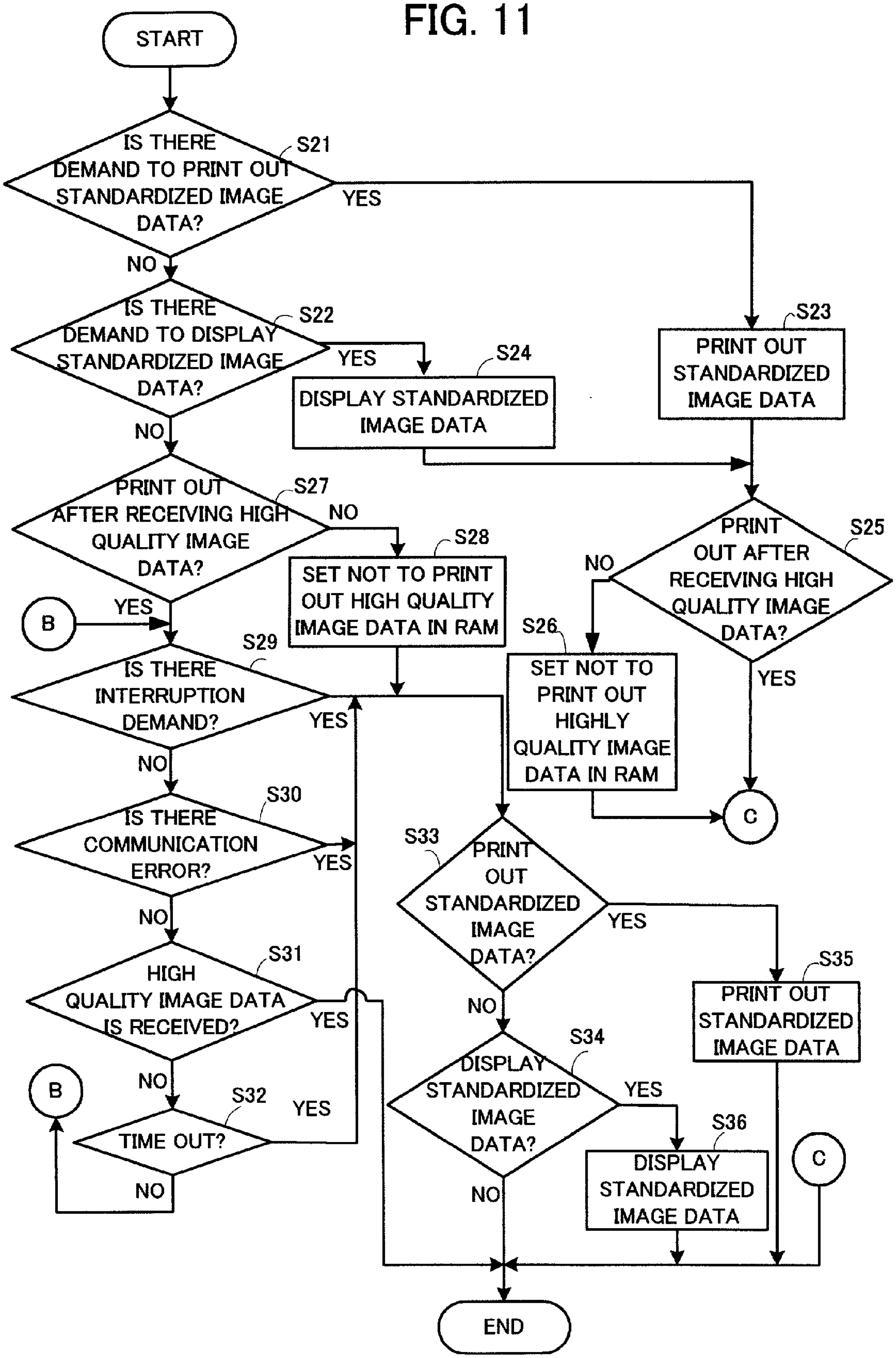
FIG. 11 is a flow chart showing the operation in the receiving ability exchanging mode of the I-FAX of the receiving side according to the first embodiment of the present invention.

Moreover, in FIG. 11, S21, S22, S25, S27, S29, S30, S31, S32, S33, S34 are shown as the determining steps, however, a part of these determining steps can be deleted. For example, when the determining step S22 and the determining step S24 accompanying S22 are deleted, and it is determined "NO" in S21, it can be proceeded to the determining step S27, and the demand for displaying the standardized image data can be made not to be accepted.

Next, a second embodiment of the present invention will be described. An I-FAX of a receiving side IC of the second embodiment is provided with a hardware structure and functions that are the same as those of the abovementioned I-FAX of the receiving side 1B of the first embodiment. In addition, the I-FAX of the receiving side 1C is used in a network environment that is similar to where the I-FAX of the receiving side 1B is provided. However, the I-FAX of the receiving side 1C differs from the I-FAX of the receiving side 1B in that the I-FAX 1C includes a function for determining destinations and distributing electronic mails in accordance with a distribution setting that is set in advance by an operator or the like, information that is written within the received electronic mail, or the like, and in that the I-FAX 1C carries out an operation to be described below when distributing the received electronic mail.

Figure 14:
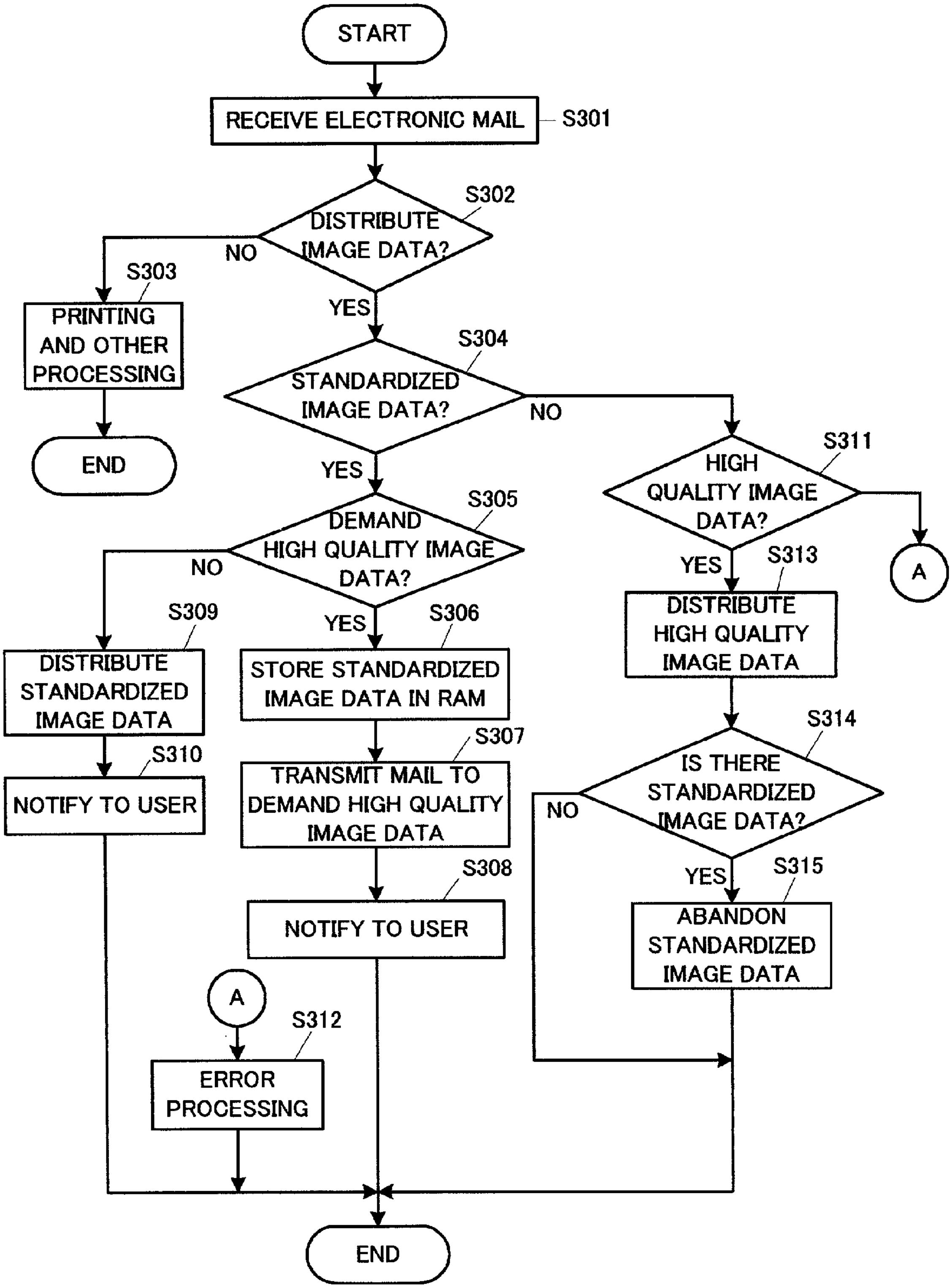
FIG. 14 is a flow chart showing an operation in the receiving ability exchanging mode of the I-FAX of the receiving side according to a second embodiment of the present invention.

The operation in the case where the I-FAX 1C distributes the received image data will be described in accordance with the flow charts shown in FIG. 14 and FIG. 15. Further, the operation to be described in accordance with the flow charts is also carried out by following the control command generated by the CPU 2 in accordance with the control program stored in the ROM 4 of the I-FAX of the receiving side 1C.

First, the I-FAX 1C receives an electronic mail as an Internet facsimile that is attached with the image data (S301), and then, the I-FAX 1C determines whether or not to distribute the attached image data in accordance with the distribution setting in the I-FAX 1C, the information written within the received electronic mail, or the like (S302). In the case of not distributing the image data, the I-FAX 1C outputs the image data to the printer 9 to print out, or carries out other processing (S303).

Meanwhile, in the case of distributing the image data, as it has been described in the first embodiment, it is determined whether or not the received electronic mail is the electronic mail attached with the standardized image data in T4 of the receiving ability exchanging mode (FIG. 3) (S304). In the case it is determined that the received electronic mail is the electronic mail in T4 of the receiving ability exchanging mode, it is determined whether or not to send back the electronic mail that is written with the receiving ability information of the I-FAX 1C, in other words, it is determined whether or not to demand for the high quality image data (S305). In the case it is determined to demand the high quality image data, the I-FAX 1C stores the standardized image data in the RAM 3 (S306), and the I-FAX 1C transmits, to the I-FAX of the transmitting side 1A, an electronic mail for demanding the high quality image data (S307). Then, the fact that the high quality image data is demanded is displayed on the display 11 or the client PC 17B, and such a fact is notified to the user (S308), and the operation for processing the electronic mail when receiving the electronic mail of T4 of the receiving ability exchanging mode (FIG. 3) is ended.

Meanwhile, in the case it is determined in S305 not to demand the high quality image data, the I-FAX 1C distributes the received standardized image data to the destination that is designated in accordance with the distribution setting or the like within the I-FAX 1C (S309), and the fact that the standardized image data is distributed is displayed on the display 11, the client PC 17B or the like, in order to notify such a fact to the user (S310). Further, this operation corresponds to the case in which the demand for the high quality image data is not carried out in the receiving ability exchanging mode, and a series of the transmission and reception operation in the receiving ability exchanging mode is ended.

Meanwhile, in the case it is determined in S304 that the received electronic mail is not the electronic mail in T4 of the receiving ability exchanging mode, it is further determined whether or not the received electronic mail is the electronic mail that is attached with the high quality image data in T6 of the receiving ability exchanging mode (S311). In the case it is determined "NO", the received electronic mail is assumed to be other electronic mail and an error processing is carried out (S312). The aforementioned other electronic mail is, for example, the electronic mail that does not include the image data as the attached file. The aforementioned error processing is, for example, processing for abandoning the other electronic mail, or for displaying the fact that the electronic mail that does not include the image data is received, on the display 11 in order to notify such a fact to the user.

Meanwhile, in the case it is determined in S311 that the received electronic mail is the electronic mail in the high quality image data transmission (T6) of the receiving ability exchanging mode, the I-FAX 1C distributes the received high quality image data to the destination that is determined in accordance with the distribution setting or the like within the I-FAX 1C (S313). Then, it is determined whether or not the standardized image data is stored in the RAM 3 (S314). In the case it is determined that the standardized image data is not stored in the RAM 3, the delivery confirmation mail is transmitted when necessary, and a series of the transmission and reception operation in the receiving ability exchanging mode is ended.

In the case the standardized image data is stored in S313, the standardized image data is deleted from the RAM 3 and abandoned (S315), and the delivery confirmation is transmitted when necessary, and a series of the transmission and reception operation in the receiving ability exchanging mode is ended.

Figure 15:
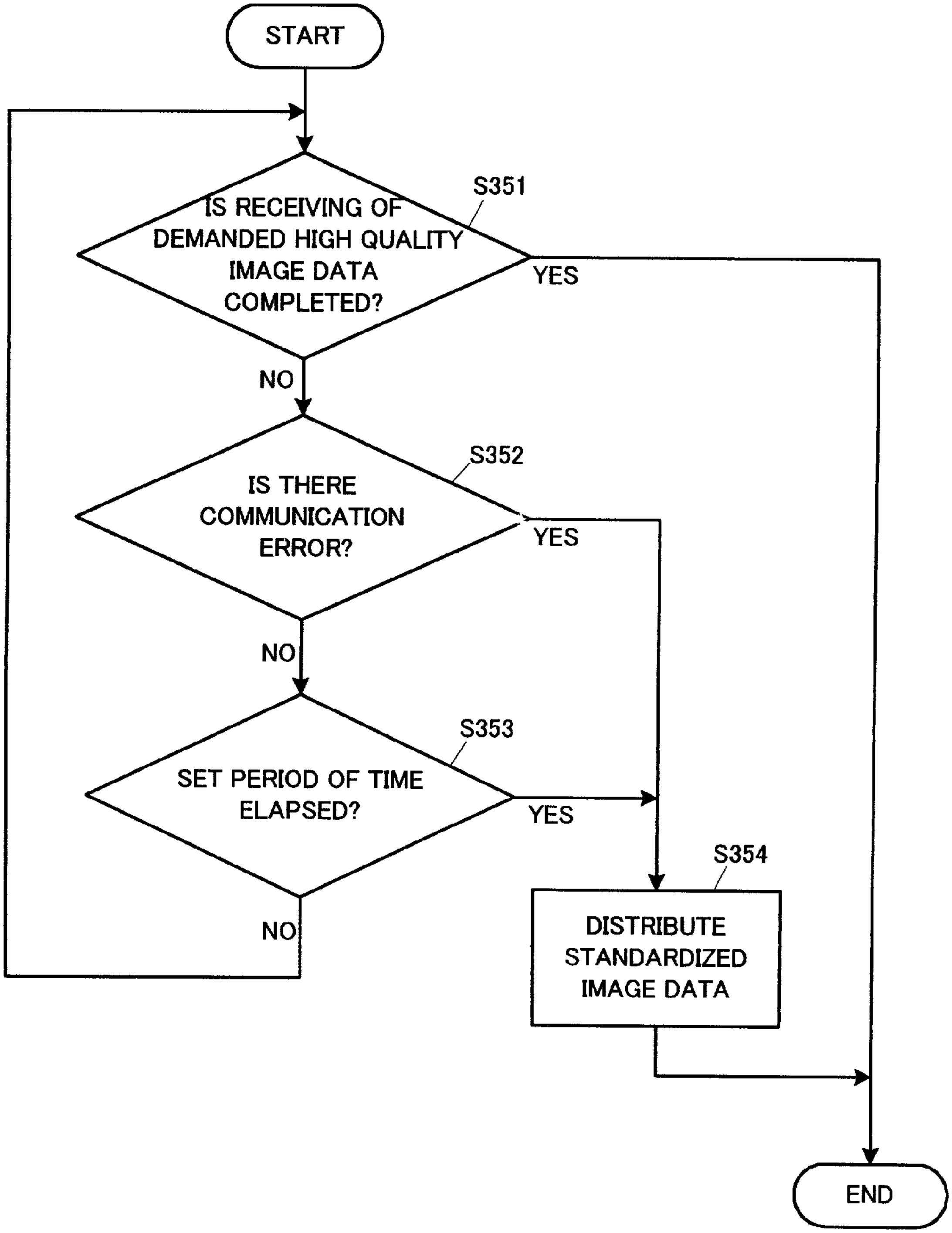
FIG. 15 is a flow chart showing an operation when the I-FAX of the receiving side demands the high quality image data according to the second embodiment of the present invention.

Next, the operation of the I-FAX 1C during a period of time when it is expected to receive the electronic mail (electronic mail corresponding to T6 of the receiving ability exchanging mode) that is attached with the high quality image data transmitted from the I-FAX of the transmitting side 1A, in the case the I-FAX of the receiving side 1C transmits the electronic mail (electronic mail corresponding to T5 of the receiving ability exchanging mode) for demanding the high quality image data in the abovementioned processing step S307, will be described in accordance with the flow chart shown in FIG. 15.

After transmitting the electronic mail for demanding the high quality image data in the abovementioned processing step S307, the I-FAX 1C checks periodically whether or not the demanded high quality image data is received (S351). Then, in the case the demanded high quality image data is received, the confirmation operation is ended. In the case the demanded high quality image data is not received (S351: NO), the I-FAX 1C checks whether or not there has been any communication error, for example, the electronic mail transmitted in S307 failed to be delivered to the destination (S352). In the case it is determined that there has not been any communication error, it is determined further whether or not the set period of time has elapsed after the transmission of the electronic mail in S307 (S353). (The set period of time is set by the user or the like from the operating unit 10, the client PC 17B or the like of the I-FAX 1C). In the case it is determined that the set period of time has not elapsed yet, the processing proceeds to the processing step S351, and the abovementioned operation is repeated.

On the other hand, in the case it is determined in S352 that the communication error is generated, or in the case the set period of time has elapsed in S353, it is determined that the high quality image data cannot be received, and the standardized image data, which has been stored in the RAM 3 in S306, is distributed to the destination that is designated in accordance with the distribution setting or the like within the I-FAX 1C (S354).

Figure 17:
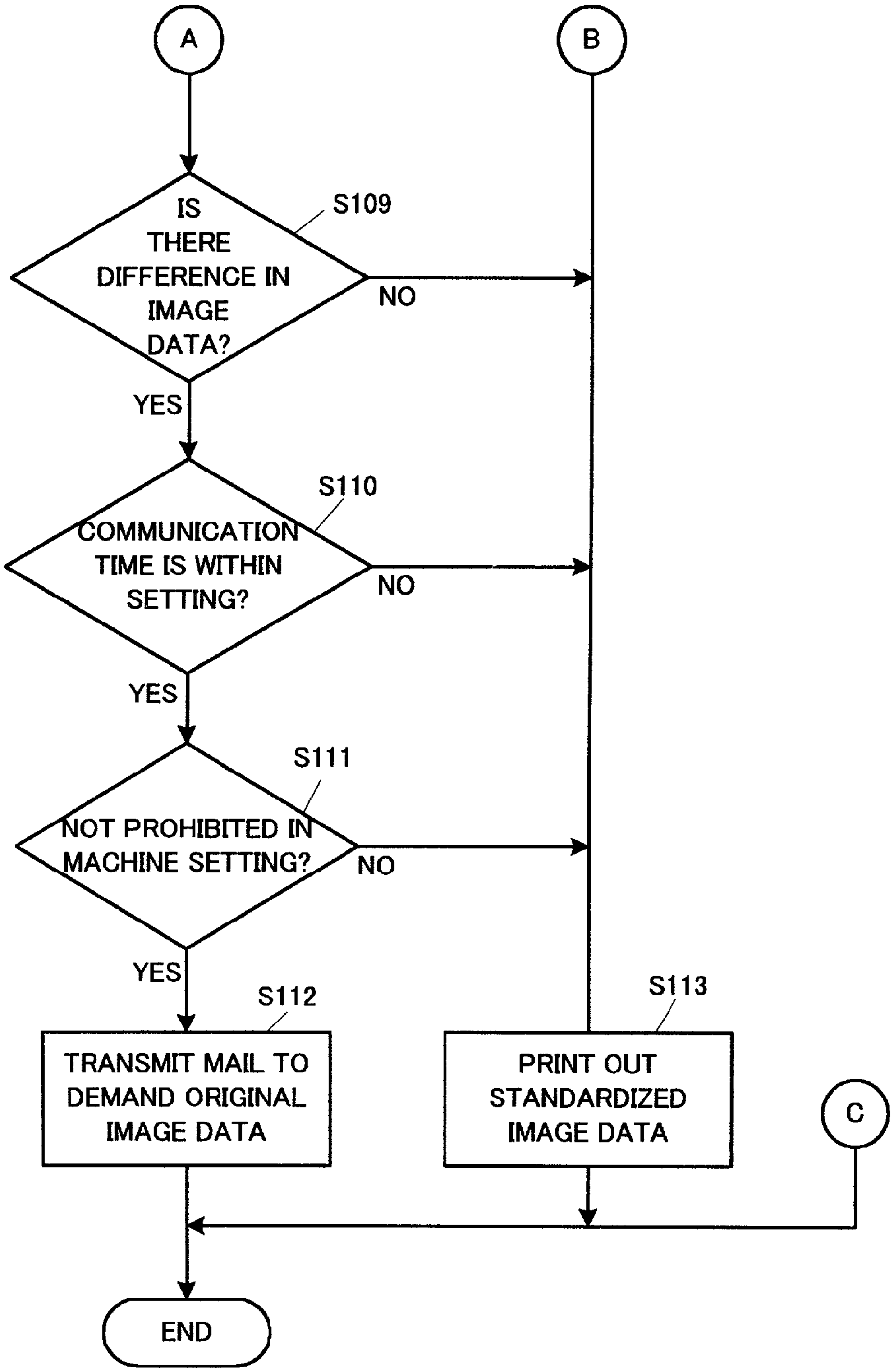
FIG. 17 is a flow chart showing the operation when receiving the electronic mail under the receiving ability exchanging mode of the I-FAX of the receiving side according to the third embodiment of the present invention.
Figure 18:
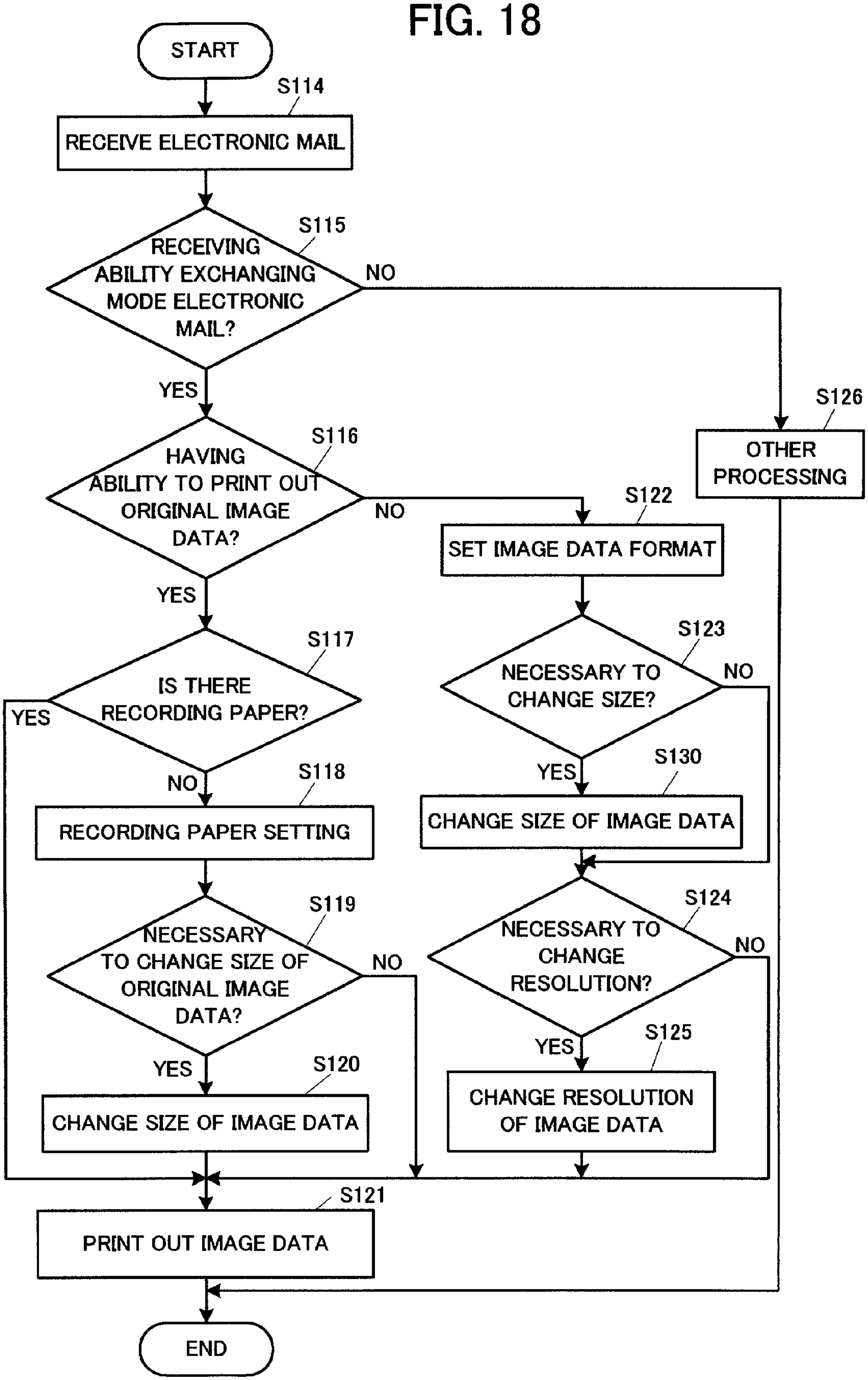
FIG. 18 is a flow chart showing the operation when receiving the electronic mail under the receiving ability exchanging mode of the I-FAX of the receiving side according to the third embodiment of the present invention.
Figure 22:
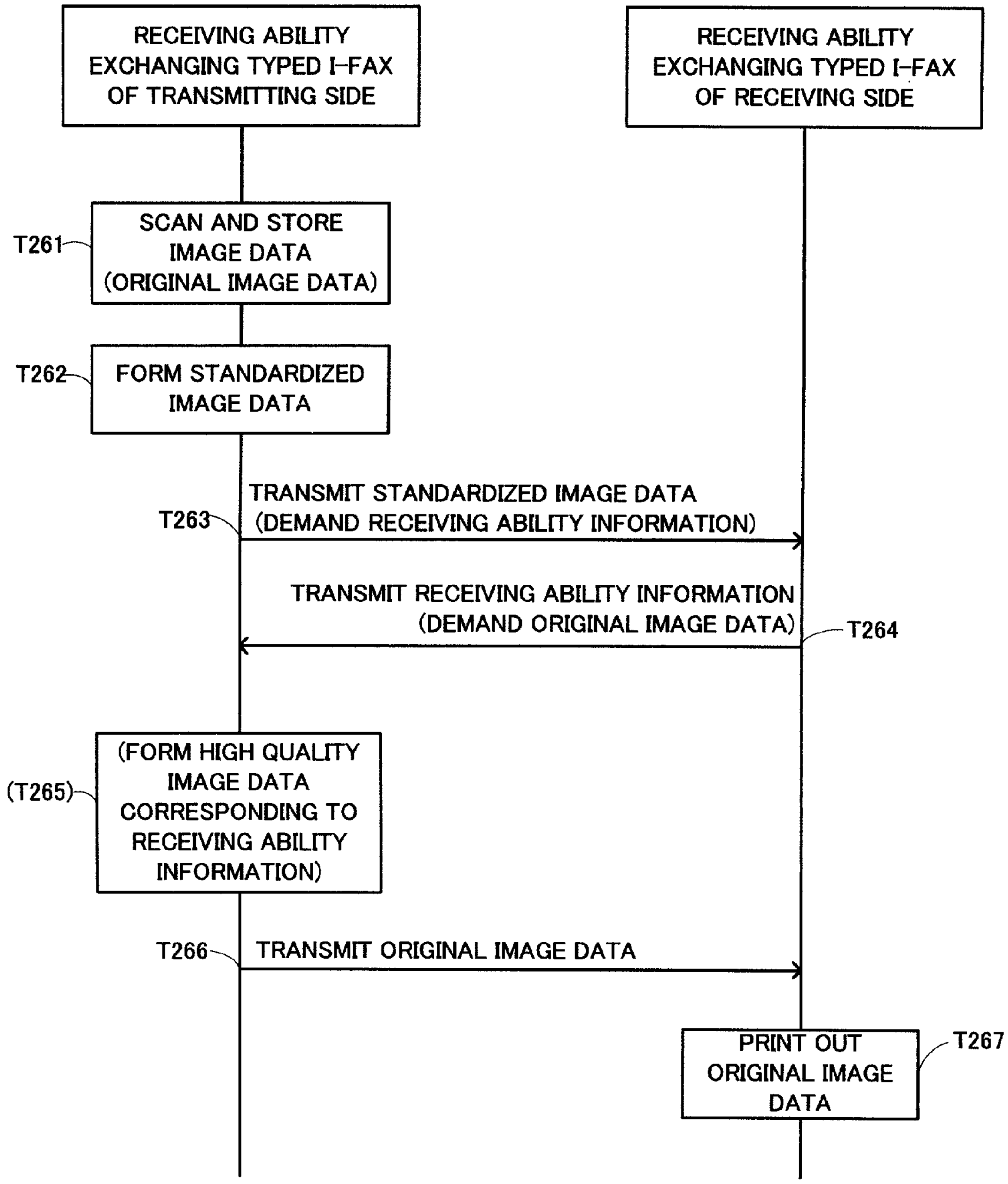
FIG. 22 is a sequence diagram showing an operation at the time of the transmission of the image data, in the I-FAX of receiving ability exchanging type of the prior art.

Next, the operation of the I-FAX of the receiving side in the receiving ability exchanging mode of a third embodiment of the present invention will be described in accordance with the flow charts shown in FIG. 16 through FIG. 18. Further, the operation to be described in accordance with these flow charts is carried out by following the control command generated by the CPU 2 in accordance with the control program that is stored in the ROM 4 in the I-FAX of the receiving side 1B. The control command includes a control command that is generated by the CPU 2 fetching the indication, which is based on the operation at the operating unit by the user, and a control command that is generated by the CPU 2 fetching the indication set in the RAM or the like in advance.

First, the I-FAX of the receiving side 1B that received the electronic mail (S101) analyzes the content of the electronic mail, and determines whether or not the electronic mail is the electronic mail to be used in the Internet facsimile, and is the electronic mail in T4 of the receiving ability exchanging mode (S102). That is, the I-FAX determines whether or not the format information 25 of the original image data is included in the electronic mail, when the received electronic mail is the electronic mail as shown in FIG. 6, or the I-FAX determines whether or not the message 24 indicating the transmission of the original image data is written in the electronic mail, when notifying the receiving ability information of the machine itself.

When it is determined "NO" in S102, in the case it is the transmission and the receiving of the image data by the simple mode or the delivery confirmation mode, the predetermined processing such as to print out the standardized image data is carried out. Moreover, when it is an error mail which cannot be analyzed, other processing determined by the control program is carried out, for example, carrying out the error processing such as to display the fact on the display (S108).

When the I-FAX of the receiving side determines that the received electronic mail is the electronic mail of the receiving ability exchanging mode in S102, the I-FAX of the receiving side 1B compares the receiving ability of the machine itself and the format information of the original image data that is written in the electronic mail. Then, the I-FAX of the receiving side determines whether or not the machine itself is provided with the ability to receive and print out the original image data (S103). In S103, for example, in the case that the format information includes the format of the paper size A3, the resolution 400 dpi, and the decoding method MMR, the I-FAX of the receiving side determines whether or not the codec is capable of decoding the original image data by MMR method, and whether or not the printer 9 is capable of printing out the original image data onto the recording paper A3 size under the resolution of 400 dpi.

When it is determined that the machine itself is not provided with the ability for receiving and printing out the original image data in S103, in accordance with the indication from the user or the setting table set is in advance which will be described hereinafter, it is determined whether or not to convert the original image data into the range of the ability of the machine itself, and then to print out the original image data (S106).

When it is determined that the machine itself is provided with the ability to receive and print out the original image data in S103, or when it is determined to convert and print out the original image data within the range of the ability of the machine itself in S106, it is determined whether or not the recording paper is set capable of being supplied to the printer 9 (S104). Such recording paper is to be in the size designated by the format of the original image data, or in the size of the converted image data when printing out the original image data after converting. This determination is for determining whether or not the corresponding recording paper is prepared in a recording paper storing unit 9*a* that is provided in a plurality in the printer 9, in accordance with a notification information of a recording paper detecting section that is provided in the recording paper storing unit 9*a*. Further, even in the case the corresponding recording paper is used up and is not prepared temporarily, if the recording paper is to be supplemented by the user in sometime in the future, it can be determined that the recording paper is prepared.

When the corresponding recording paper is not prepared in S104, in accordance with the indication from the user or the setting that is set in advance, it is determined whether or not to print out the image data onto the recording paper of different size (S107).

Next, when it is determined that the corresponding recording paper is present in S104, or when it is determined to print out the original image data onto the recording paper of different size in S107, by comparing usable memory remaining capacity shown in a memory capacity detecting section 3*a* and a data amount expected for the original image data, it is determined whether or not necessary memory capacity is remaining for storing the original image data into the RAM 3 (S105). Moreover, it can be determined by comparing a determining standard of the memory remaining capacity that is set by the user in advance and stored in the RAM 3, and the usable memory remaining capacity shown by the memory capacity detecting section 3*a*. This determining standard is to determine that there is no necessary memory capacity when the memory remaining capacity falls short of, for example, ten percent of the entire memory capacity, and this percentage is to be set by the user.

In the case the necessary memory capacity for storing the original image data is remaining in the RAM 3, it is determined whether or not there is enough difference between the standardized image data and the original image data (S109). For example, the enough difference is to be determined in accordance with a determining standard table TA1, when the determining standard table TA1 that defines the determining standard for the difference in the image data as shown in FIG. 19 is stored in the RAM in advance as a default setting of the user or the I-FAX 1B.

According to the determining standard table TA1, for the determining standard of the difference among each image data, a recording paper size 34 and a resolution 35 can be set, and each can be set by the ratio compared to a standard format 33 or the specific recording paper size or the resolution. In the case the format of the image data exceeds these settings, it is to be determined that there is the difference. In the example of the determining standard table TA1, as the default value, the percentage is set at 120%, the recording paper size is set at B4, and the resolution is set at 240 dpi, however, this can be changed freely by the setting operation by the user.

In accordance with the abovementioned setting of the determining standard, when it is determined that there is the difference between the standardized image data and the original image data in S109, it is determined whether or not the received electronic mail is being transmitted within a prescribed period of time (S110). This is for comparing the difference between the transmitting time of the I-FAX of the transmitting side 1A and the receiving time of the I-FAX of the receiving side 1B, or the difference between the transmitting time and the arrival time to the mail server 16B, with a determining standard time set in advance by the user, for example, within 12 hours.

In the case the receiving is carried out within a prescribed period of time in S110, it is determined lastly whether or not the demand for the original image data is prohibited by the setting of the machine by the user. When it is determined that the demand is not prohibited, the I-FAX of the receiving side transmits the electronic mail that is written with the receiving ability information of the machine itself and the message for demanding the transmission of the original image data, as shown in FIG. 7 (S102).

Meanwhile, when it is determined "NO" in each of S105, S106, S107, S109, S110, S111, the original image data is not demanded, the standard image data attached to the received electronic mail is printed out, and the processing is ended (S103). Moreover, the delivery confirmation mail not demanding the transmission of the original image data as shown in FIG. 5 can be transmitted after printing out the standard image data, and the processing can be ended as the communication of the delivery confirmation mode.

Further, in each determining step S104, S105, S109, S110, S111, whether or not to carry out the determination can be skipped in accordance with the setting of which is formed as the table TB1 in advance as the indication of the user or the default setting of the machine as shown in FIG. 20.

Moreover, by preparing a setting table TC1 shown in FIG. 21 for the determining steps S106, S107, the determination in accordance with the setting table TC1 can be carried out.

In the case the table TB1 shown in FIG. 20, whether or not to carry out the determining step for determining the presence or the absence of the recording paper in S104, can be indicated by a default setting 136 or an individual setting 137 of the machine.

Figure 16:
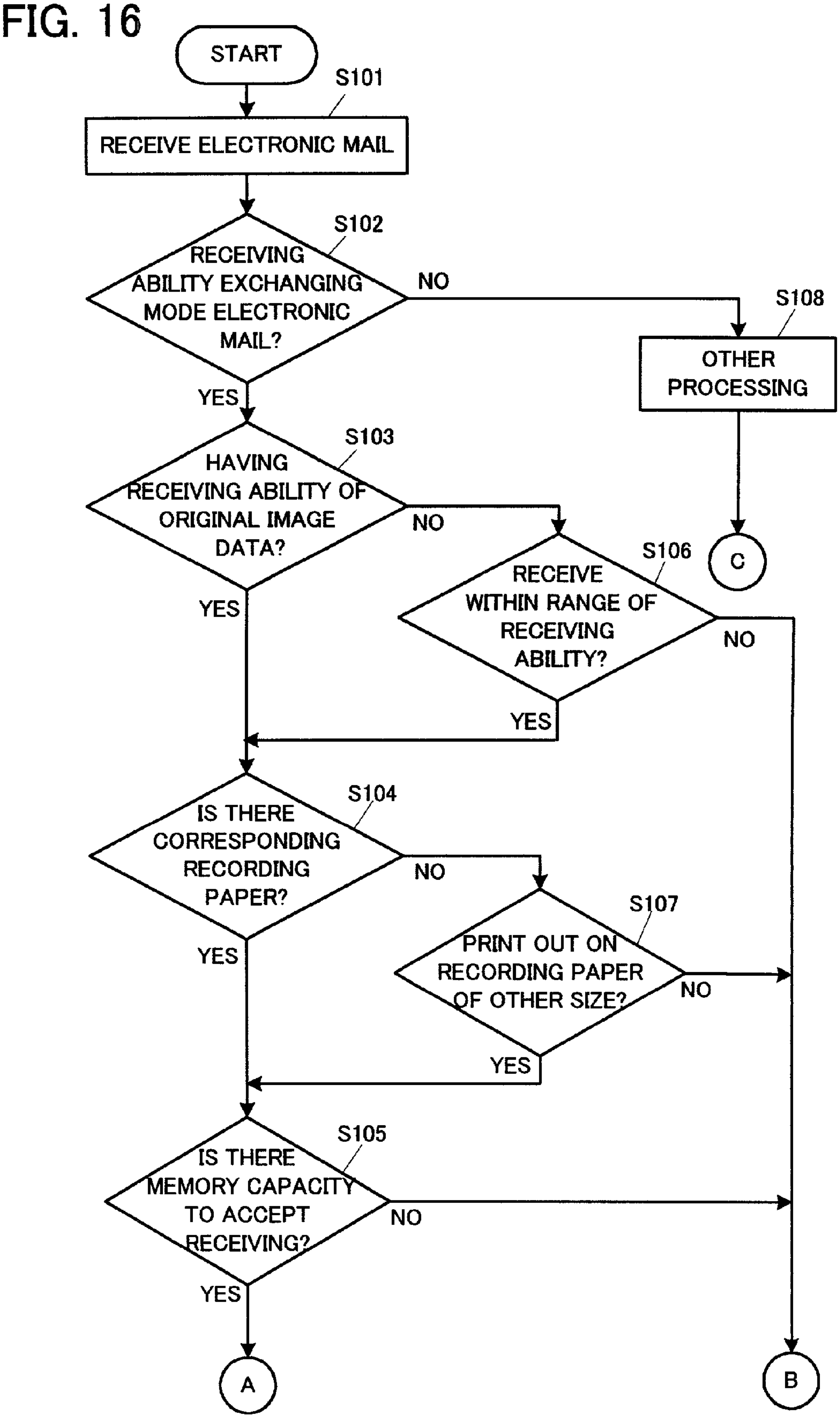
FIG. 16 is a flow chart showing the operation when receiving the electronic mail under the receiving ability exchanging mode of the I-FAX of the receiving side according to a third embodiment of the present invention.

Describing in a further detail, in the case the default setting 136 of the I-FAX of the receiving side 1B is set "to determine", and it does not correspond to each item in the individual setting 137, the determining step of S104 is carried out for determining whether or not there is the recording paper, and the processing is to diverge according to the presence or the absence of the recording paper as shown in the flow chart of FIG. 16. Meanwhile, in the individual setting 137, the setting can be made for each item, "to determine" for when carrying out the determining step of S104, and "not to determine" for when not carrying out the determining step of S104. In the table TB1, for the item "to determine", the transmitting side address 138 is "SenderA@terminalB.ifax", the transmitting side domain name 139 is "jp", the term designation 140 of the received time is "23:00–8:00 everyday", and the setting per communication 141 is "next receiving". Therefore, in each of the case when the transmitting side address of the received electronic mail address is "SenderA@terminalB.ifax", when the transmitting side domain name is "jp", when the received time is between 23:00 and 8:00 of everyday, and when the electronic mail is received in the next time and it is determined that the determination in S104 is necessary, the determination in S104 is carried out, and according to the presence or the absence of the recording paper, the processing is to diverge.

As in the same manner, the designation can be carried out by the transmitting side address or the like also in the item of "not to determine", and when the received electronic mail is the electronic mail corresponding to the abovementioned cases, regardless of the default setting 136, the determination in S4 is not to be carried out. In other words, it is to be determined "Yes" without condition, and it is to be proceeded to the next step S105.

The similar setting can be carried out also in the determining steps of S105 and after, and in accordance with the item set in the table TB1, it can be selected whether to carry out the determination, or to proceed to the next step by skipping the determining step.

Further, for the term designation 40, other than the abovementioned format, the designation by various formats can be carried out, for example, a range setting 142 with the date and time as "01/May/2 23:00–01/May/6 8:00", or a day of the week designation 143 such as "Sunday" or "Saturday".

Moreover, the setting table TC1 shown FIG. 21 is an example of the table to be referred to in the determining steps of S106 and S107. According to the setting table TC1, for example, since a default setting 144 of when determining in S106 is set "to receive", in the case it does not correspond to the individual setting 145, it is to be determined to receive within the range of the ability of the machine itself. Moreover, since the default setting 144 is set "not to receive" for the determining in S107, in the case it does not correspond to the individual setting 145, it is to be determined not to print out the original image data on the recording paper of different size.

In the individual setting 145, each of the items, the transmitting side address, the transmitting side domain name, the term designation, and the setting per communication can be set as in the same manner as the table TB1. In the case the received electronic mail corresponds to the individual setting, in accordance with the individual setting, the determination is to be carried out by the determining step of S106 or S107.

After demanding the original image data in S112, the I-FAX of the receiving side 1B receives the electronic mail that is attached with the original image data transmitted by the I-FAX of the transmitting side 1A in accordance with the demand. Next, the operation of when receiving the electronic mail will be described in accordance with the flow chart shown in FIG. 18.

First, the I-FAX of the receiving side receives the electronic mail (S114), analyzes the content of the received electronic mail, and determines whether or not the received electronic mail is the electronic mail to be used for the Internet facsimile, and also is a mail including the original image data transmitted in T6 of the aforementioned receiving ability exchanging mode (S115). That is, when receiving the electronic mail as shown in FIG. 8, the I-FAX of the receiving side determines whether or not the original image data 30 is included in the received electronic mail, or, whether or not a message-ID of the electronic mail of the receiving ability exchanging mode received in prior to the processing for the time being is written as an Original-Message ID 32.

When it is determined "NO", since the received electronic mail is not the electronic mail to be transmitted in T6 of the receiving ability exchanging mode, other processing is to be carried out (S126). The other processing is, for example, the receiving processing under different communication mode such as the simple mode, and the error processing of when receiving the electronic mail that cannot be analyzed.

When the received electronic mail is determined to be the mail transmitted in T6 of the receiving ability exchanging mode in S115, next, it is determined whether or not there is the ability itself to print out the attached original image data by the printer 9 under the format as is (S116). That is, it is determined whether or not the printer 9 is provided with the ability to print out under the recording paper size and the resolution that are designated by the format of the original image data.

When it is determined that the printer 9 is provided with the ability to print out the original image data in S116, it is determined whether or not the recording paper of the size designated by the format of the original image data is prepared in the recording paper storing unit 9*a* of the printer 9 (S117). When such recording paper is prepared, the recording paper is supplied, and the original image data is printed out onto the recording paper size as the resolution that are designated by the format (S121).

When the recording paper is not prepared in S117, the original image data is to be printed out on the recording paper of the other size that is designated by the format of the original image data, and the size of the recording paper to be used is set (S118).

Next, to print out the original image data onto the recording paper of the size set in S118, it is determined whether or not it is necessary to change the size of the original image data (S119). This corresponds to, for example, the case in which the size set in S118 is smaller than the recording paper size of the original image data, and it is necessary to reduce the size of the original image data.

Next, when it is determined that it is necessary to change the size of the original image data in S119, after changing the size of the image data, for example, by reducing the original image data (S120), the original image data is printed out onto the recording paper (S121). When it is not necessary to change the size of the original image data in S119, the original image data is printed out onto the recording paper in the size as is (S121).

Meanwhile, when it is determined that the original image data cannot be printed out in the format as is in S116, the original image data is to be printed out after being converted into the range that can be printed out by the machine itself, and the format of the converted image data is to be set (S122).

Next, in accordance with the format of the image data set in S122, it is determined whether or not it is necessary to change the size of the original image data (S123), and when the change is necessary, the size of the original image data is changed into the size of the format set in S122 (S130).

Next, it is determined whether or not it is necessary to change the resolution of the original image data (S124), and when the change is necessary, the resolution of the original image data is changed into the resolution of the format set in S122 (S125).

Since the original image data is converted into the image data that can be printed out by the I-FAX 1B by the processing of S122 through S125, the image data is printed out (S121).

What is claimed is:

1. An Internet facsimile machine comprising:

a processor for receiving an electronic mail including format information of an original image data and a standardized image data, returning an electronic mail having machine receiving ability information, and receiving an electronic mail including high quality image data formed in accordance with the machine receiving ability information, wherein the processor processes the standardized image data before returning the email having the machine receiving ability information; and a controller for setting functions of the processor.

2. The Internet facsimile machine according to claim 1, wherein the function of the processor is to store in a storing device, the standardized image data that is received before returning the email having the machine receiving ability information without printing it out.

3. The Internet facsimile machine according to claim 1 further comprising a processor for writing a message for demanding high quality image data in the electronic mail having the machine receiving ability information.

4. The Internet facsimile machine according to claim 3 further comprising a processor for informing that the high quality image data has been demanded.

5. The Internet facsimile machine according to claim 1, wherein the function of the processor is to cause to store in the storing device, the standardized image data that is received before returning the email having the machine receiving ability information, return the electronic mail having machine receiving ability information, receive the electronic mail attached with the high quality image data that is formed in accordance with the receiving ability information, print out the high quality image data, and delete the standardized image data from the storing device.

6. The Internet facsimile machine according to claim 1 further comprising a processor for determining whether or not the electronic mail including the high quality image data has been received.

7. The Internet facsimile machine according to claim 6 further comprising a processor for determining whether or not a preset time limit has expired for receiving the electronic mail including the high quality image data, when the processor determines that the high quality image data has been received.

8. The Internet facsimile machine according to claim 7, wherein the standardized image data is printed out when the processor determines a preset time limit has expired.

9. The Internet facsimile machine according to claim 1, wherein the functions of the processor are carried out in accordance with the setting functions that are set in advance.

10. An Internet facsimile machine comprising:

a processor for receiving an electronic mail including format information of an original image data and the standardized image data, returning an electronic mail having machine receiving ability information; and receiving an electronic mail including high quality image data formed in accordance with the machine receiving ability information; and a processor for processing not to demand the high quality image data when the standardized image data received has been printed out, before returning the email having the machine receiving ability information has been printed out.

11. An Internet facsimile machine comprising:

a processor for receiving an electronic mail including format information of the original image data and a standardized image data, returning an electronic mail having machine receiving ability information, and receiving an electronic mail attached with the original image data;

a detector for detecting a condition of the Internet facsimile machine; and a processor for determining whether or not to demand the original image data in accordance with the condition of the Internet facsimile machine that is detected by the detector, wherein the processor determines not to demand the original image data in the case there is no appropriate recording paper in the Internet facsimile machine.

12. The Internet facsimile machine according to claim 11 further comprising a controller for setting a determining standard of the processor.

13. The Internet facsimile machine according to claim 11, wherein the Internet facsimile machine does not have appropriate recording paper when its recording paper size does not match a paper size in the format information of the original image data.

14. The Internet facsimile machine according to claim 11, wherein the processor determines not to demand the original image data when there is no storing capacity in the storing device.

15. An Internet facsimile machine comprising:

a processor for receiving an electronic mail including format information of the original image data and a standardized image data, returning an electronic mail, and receiving the electronic mail attached with the original image machine in accordance with the receiving ability information;

a processor for determining whether or not to demand the original image data in accordance with the format information of the original image data; and a controller for setting a determining standard by the determining processor, wherein the processor determines whether or not to demand the original image data in accordance with the difference between the size of standardized image data and the size of the original image data.

16. An Internet facsimile machine comprising:

a processor for receiving an electronic mail including format information of the original image data and a standardized image data, returning an electronic mail, and receiving the electronic mail attached with the original image machine in accordance with the receiving ability information;

a processor for determining whether or not to demand the original image data in accordance with the format information of the original image data; and a controller for setting a determining standard by the determining processor, wherein the processor determines whether or not to demand the original image data in accordance with the difference between a resolution of the standardized image data and a resolution of the original image data.

17. An Internet facsimile machine comprising:

a function for receiving an electronic mail including format information of the original image data and a standardized image data, returning an electronic mail having machine receiving ability information, and receiving high quality image data formed machine in accordance with the receiving ability information, as an electronic mail; and a function for distributing the received image data; wherein in the case of receiving the standardized image data and returning an electronic mail that is written with the receiving machine ability information, the Internet facsimile machine does not carry out the distribution of the standardized image data, and when receiving the high quality image data afterwards, the Internet facsimile machine distributes only the high quality image data.

18. The Internet facsimile machine according to claim 17, wherein in the case of receiving the standardized image data and returning the electronic mail that is written with the machine receiving ability information, the Internet facsimile machine stores the standardized image data, and then, when determining that the high quality image data cannot be received, the Internet facsimile machine distributes the stored standardized image data.

19. An Internet facsimile machine comprising:

a processing means for receiving an electronic mail including format information of an original image data and a standardized image data, returning an electronic mail having machine receiving ability information, and receiving an electronic mail including high quality image data formed in accordance with the machine receiving ability information, wherein the processing means processes the standardized image data before returning the email having the machine receiving ability information; and a controlling means for setting functions of the processing means.

20. A method for processing electronic mail comprising:

receiving an electronic mail including format information of an original image data and a standardized image data;

returning an electronic mail having machine receiving ability information;

receiving an electronic mail including high quality image data formed in accordance with the machine receiving ability information;

processing the standardized image data before returning the email having the machine receiving ability information; and setting processing functions.

* * * * *